United States Patent
Shinohara et al.

(10) Patent No.: US 6,422,943 B2
(45) Date of Patent: Jul. 23, 2002

(54) GAME APPARATUS, GAME MACHINE MANIPULATION DEVICE, GAME SYSTEM AND INTERACTIVE COMMUNICATION METHOD FOR GAME APPARATUS

(75) Inventors: Satoshi Shinohara, Tokyo; Toshio Honda, Kanagawa, both of (JP)

(73) Assignee: Sony Computer Entertainment, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,895

(22) PCT Filed: Aug. 24, 1998

(86) PCT No.: PCT/JP98/03748

§ 371 (c)(1),
(2), (4) Date: Apr. 22, 1999

(87) PCT Pub. No.: WO99/10060

PCT Pub. Date: Mar. 4, 1999

(30) Foreign Application Priority Data

Aug. 24, 1997 (JP) .............................. 9-242065
Aug. 24, 1997 (JP) .............................. 9-242066

(51) Int. Cl.$^7$ ............................................. A63F 13/02
(52) U.S. Cl. ........................................ 463/37; 463/43
(58) Field of Search .......................... 463/37, 47, 38, 463/39, 30, 7, 36, 43, 44, 46; 273/85 G, 148 B, 434–438, 442, 454, 460, DIG. 28; 345/156–163, 167–169, 173; 710/63

(56) References Cited

U.S. PATENT DOCUMENTS 5,299,810 A * 4/1994 Pierce et al. ............... 273/434
5,396,267 A 3/1995 Bouton (List continued on next page.)

FOREIGN PATENT DOCUMENTS

| EP | 0771015 | 5/1997 |
| JP | 04354012 A | 8/1992 |

(List continued on next page.)

OTHER PUBLICATIONS

Utility Model Application Laid–open No. Hei 1–161783.

Utility Model Application Laid–open No. Hei 5–92848.

(List continued on next page.)

*Primary Examiner*—Valencia Martin-Wallace
*Assistant Examiner*—Julie Brochetti
(74) *Attorney, Agent, or Firm*—Fulwider Patton Lee & Utecht, LLP

(57) ABSTRACT

By transmitting function information indicative of functions of a game machine manipulation device CT10, previously stored therein, to a game machine main body 27 with a command from the game machine main body 27, it is possible to retrieve functions of the game machine manipulation device CT10 required for the game machine main body 27 and to set the retrieved functions of the game machine manipulation device CT10 in the game machine manipulation device CT10. Further, by transmitting function information indicative of consumed power of respective response means 21, 51 of the game machine manipulation device CT10, which is previously stored in the game machine manipulation device CT10, to the game machine main body 27 with a command from the game machine main body 27, it is possible to determine response means 21, 51 required for the game machine main body 27 and a power value to be applied to the response means, and to set the determined information to the response means 21, 51 of the game machine manipulation device CT10.

8 Claims, 26 Drawing Sheets

U.S. PATENT DOCUMENTS

| | | | | |
|---|---|---|---|---|
| 5,423,555 | A | * 6/1995 | Kidrin | 273/434 |
| 5,542,672 | A | * 8/1996 | Meredith | 463/37 |
| 5,565,840 | A | 10/1996 | Thorner et al. | |
| 5,587,559 | A | 12/1996 | Fleck et al. | |
| 5,591,104 | A | 1/1997 | Andrus et al. | |
| 5,713,792 | A | * 2/1998 | Ohzono et al. | 463/7 |
| 5,791,994 | A | * 8/1998 | Hirano et al. | 463/43 |
| 5,806,849 | A | * 9/1998 | Rutkowski | 273/438 |
| 5,807,175 | A | * 9/1998 | Davis et al. | 463/36 |
| 5,857,986 | A | * 1/1999 | Nishiumi et al. | 345/157 |
| 5,897,437 | A | * 4/1999 | Nishiumi et al. | 463/47 |
| 5,935,224 | A | * 8/1999 | Svancarek et al. | 710/63 |
| 5,984,785 | A | * 11/1999 | Takeda et al. | 463/38 |

FOREIGN PATENT DOCUMENTS

| | | | | |
|---|---|---|---|---|
| JP | 5-200161 | 8/1993 | | |
| JP | 06-246066 | 6/1994 | | |
| JP | 7/88252 | 4/1995 | | |
| JP | 7-265546 A | 10/1995 | | |
| JP | 07-323158 | 12/1995 | | |
| JP | 08-117444 | 5/1996 | | |
| JP | 8-147077 A | 6/1996 | | |
| JP | 8152945 | 6/1996 | | |
| JP | 8-248093 A | 9/1996 | | |
| JP | 09-000741 | 7/1997 | | |
| WO | WO 96/12250 | 4/1996 | | |
| WO | WO-96/12250 | * 4/1996 | | G06K/11/20 |
| WO | WO 9705542 | 2/1997 | | |
| WO | WO 9719440 | 5/1997 | | |

OTHER PUBLICATIONS

Patent Application Laid–open No. Sho 60–168479.
Utility Model Application Laid–open No. Sho 61–143241.
Patent Application Laid–open No. Hei 9–185437.
Patent Application Laid–open No. Hei 6–259359.
Patent Application Laid–open No. Hei 9–164270.

* cited by examiner

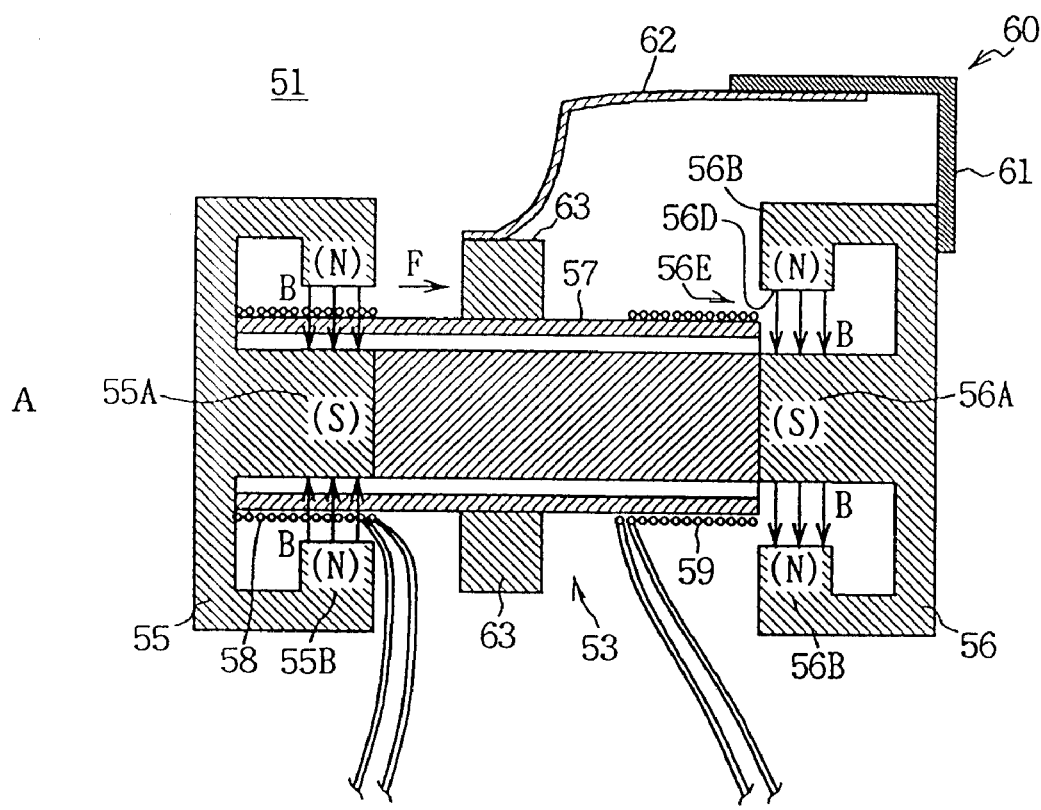
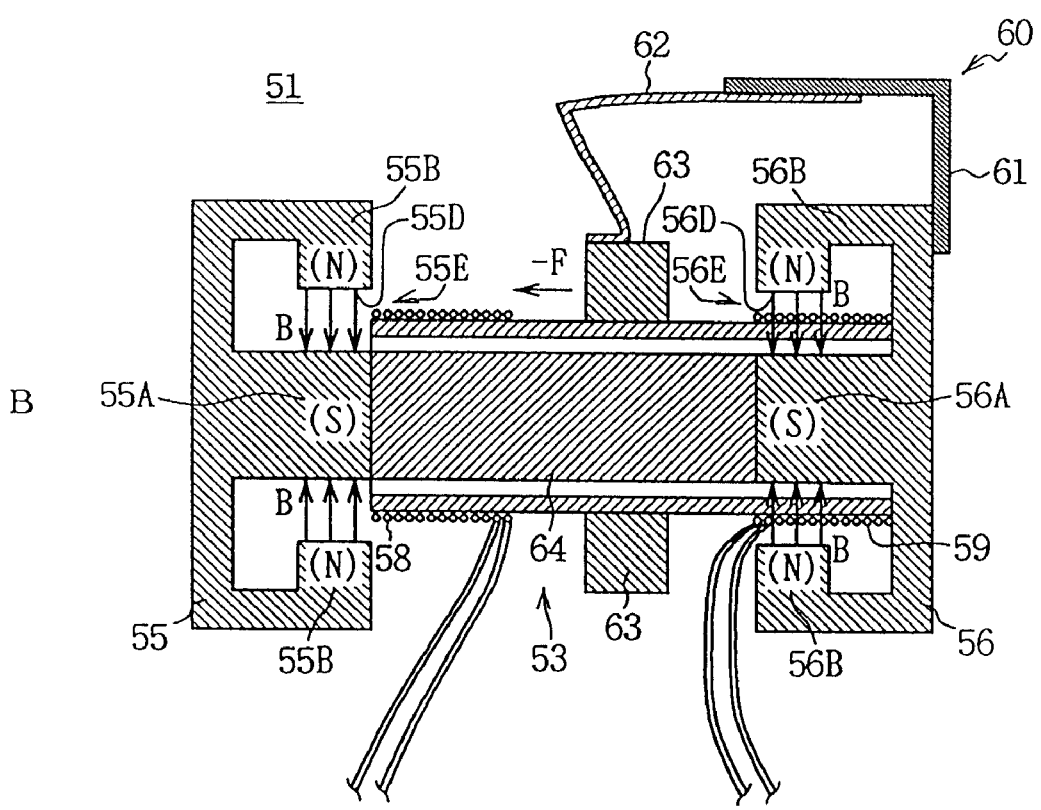
FIG. 9

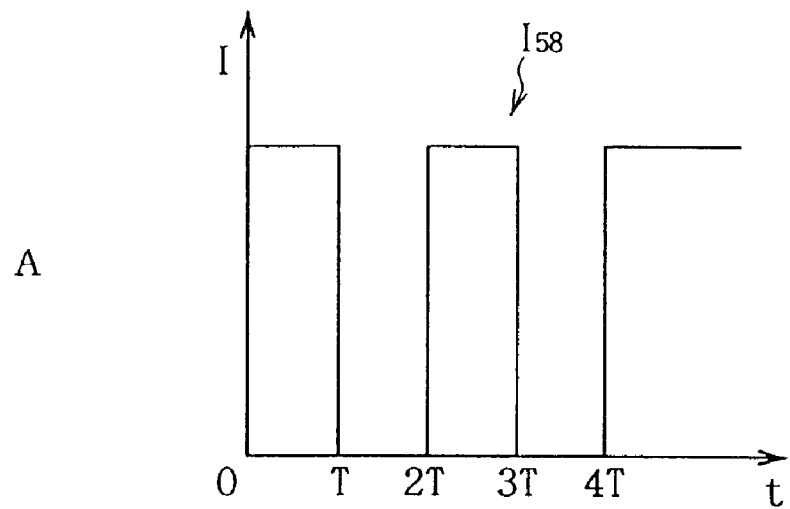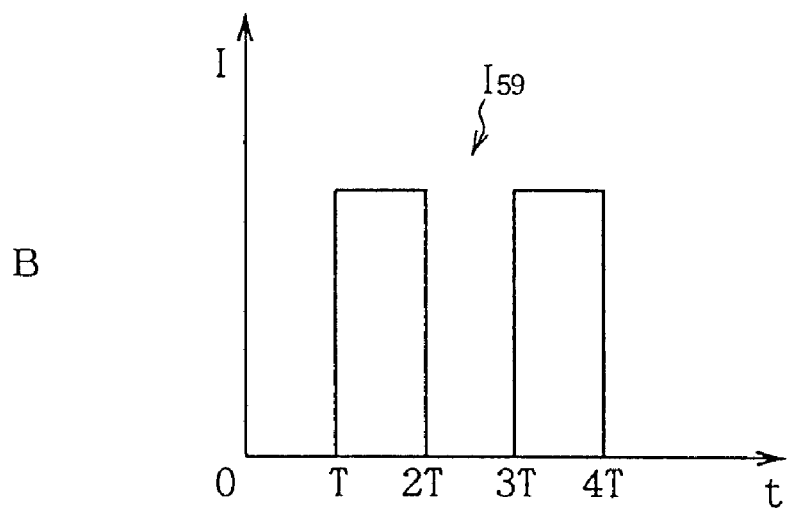
FIG. 10

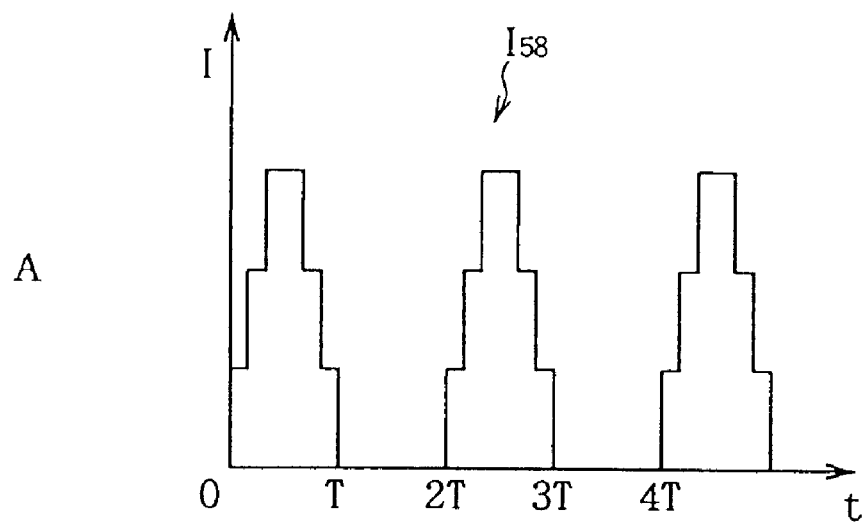
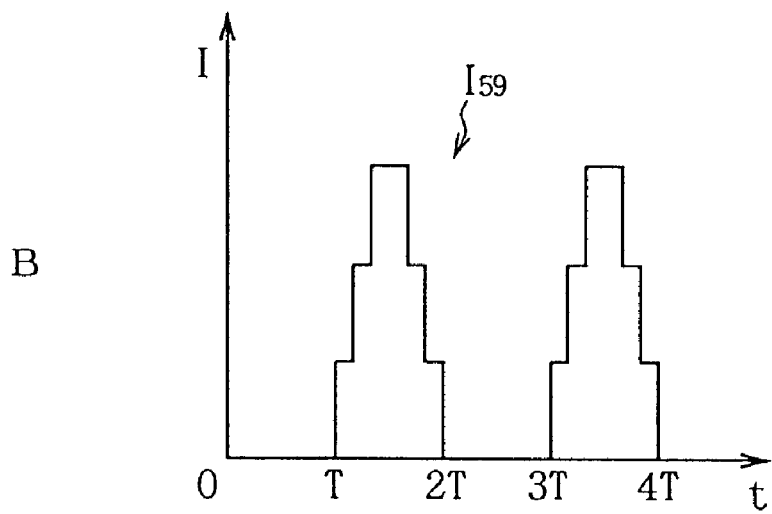
FIG. 11

|  | BYTE NO. | 1 | 2 | 3 | 4 | 5 | 6 | 7 | 8 | 9 |
|---|---|---|---|---|---|---|---|---|---|---|
| | TRANSMISSION DATA FROM MAIN BODY | 01 | 43 | 00 | md | xx | xx | xx | xx | xx |
| | TRANSMISSION DATA FROM MANIPULATION DEVICE | dm | F3 | in | xx | xx | xx | xx | xx | xx | tx0 tx1 tx2 tx3 tx4 tx5
rx0 rx1 rx2 rx3 rx4 rx5 in: 00 CONTROLLER IS NOT INITIALIZED, AND 5A FROM NEXT PACKET IF md=1 IS SET BY THIS [43] COMMAND.
md: SETS CONTROLLER PARAMETER SETTING MODE ON=1/OFF=0.

FIG. 15

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 45 | 00 | xx | xx | xx | xx | xx | xx |
| TRANSMISSION DATA FROM MANIPULATION DEVICE | dm | F3 | in | rv | mn | cm | an | on | xx | tx0 tx1 tx2 tx3 tx4 tx5
rx0 rx1 rx2 rx3 rx4 rx5 in: 00 CONTROLLER IS NOT INITIALIZED, AND 5A AFTER RELEASED.
rv: REVISION MODE SUPPORTED BY CONTROLLER.
mn: TOTAL NUMBER OF CONTROLLER MODES WHICH CAN BE SET BY SOFTWARE.
cm: CURRENTLY OPERATING CONTROLLER MODE IS RETURNED AS CONTROLLER MODE LIST NUMBER AT WHICH CONTROLLER ID IS STORED.
an: TOTAL NUMBER OF EQUIPPED ACTUATORS (OR DEVICES CORRESPONDING TO ACTUATORS) (FIXED FOR PHYSICAL CONTROLLERS).
on: TOTAL NUMBER OF COMBINATION LISTS OF SIMULTANEOUSLY OPERABLE ACTUATORS (VALIABLE FOR EACH CONTROLLER MODE).

FIG. 16

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 4C | 00 | ln | xx | xx | xx | xx | xx |
| TRANSMISSION DATA FROM MANIPULATION DEVICE | dm | F3 | in | xx | xx | n0 | n1 | xx | xx |

Top labels: tx0 tx1 tx2 tx3 tx4 (over bytes 5–9), tx5 at end.
Bottom labels: rx0 rx1 rx2 rx3 rx4 (over bytes 5–9), rx5 at end.

{
in: 00 WHEN CONTROLLER IS NOT INITIALIZED, AND 5A AFTER RELEASED.
ln: REQUIRED CONTROLLER ID LIST NUMBER.
n0,n1: CONTROLLER ID FETCHED FROM MATRIX IN WHICH AVAILABLE MODES (INPUTTED AS CONTROLLER IDS) ARE ENTERED.
}

FIG.17

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 44 | 00 | cm | lk | xx | xx | xx | xx |
| TRANSMISSION DATA FROM MANIPULATION DEVICE | dm | F3 | in | xx | xx | xx | xx | xx | xx |

Top labels: tx0 tx1 tx2 tx3 tx4 (over bytes 5–9), tx5 at end.
Bottom labels: rx0 rx1 rx2 rx3 rx4 (over bytes 5–9), rx5 at end.

{
in: 00 WHEN CONTROLLER IS NOT INITIALIZED, AND 5A AFTER RELEASED.
cm: SPECIFIED IN THE FORM OF CONTROLLER MODE LIST NUMBER IN WHICH CONTROLLER ID OF CONTROLLER MODE TO BE SET IS STORED.
lk: LOCKING OF CONTROLLER MODE SWITCH BUTTON ATTACHED TO CONTROLLER (lock=3/unlock=2/un-change=0or1)
}

FIG.18

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 46 | 00 | an | xx | xx | xx | xx | xx |
| TRANSMISSION DATA FROM MANIPULATION DEVICE | dm | F3 | in | xx | xx | fn | sb | ln | ic | tx0 tx1 tx2 tx3 tx4 (columns 4–8), tx5 at end
rx0 rx1 rx2 rx3 rx4 (columns 4–8), rx5 at end

- in: 00 WHEN CONTROLLER IS NOT INITIALIZED, AND 5A AFTER RELEASED.
- fn: FUNCTION CLASSIFICATION NUMBER. CLASSIFICATION NUMBER FOR ESTIMATING FUNCTION OF ACTUATOR.
- sb: AUXILIARY NUMBER. NUMBER FOR FURTHER CLASSIFYING IN GREATER DETAIL ACTUATORS CLASSIFIED BY FUNCTION CLASSIFICATION NUMBER.
- ln: DATA LENGTH(BYTES) OF ACTUATOR PARAMETER(DATA REQUIRED TO SET OPERATION OF ACTUATOR.
- ic: CONSUMED CURRENT REQUIRED TO DRIVE ACTUATOR. (UNIT: [10mA])

FIG. 19

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 48 | 00 | an | xx | xx | xx | xx | xx |
| TRANSMISSION DATA FROM MANIPULATION DEVICE | dm | F3 | in | xx | xx | v0 | v1 | sz | s0 |

- in: 00 WHEN CONTROLLER IS NOT INITIALIZED, AND 5A AFTER RELEASED.
- an: NUMBER OF ACTUATOR FOR WHICH STATUS IS DESIRED TO BE KNOWN.
- v0,v1: RESERVED(CURRENTLY 00 IS RETURNED)
- sz: DATA LENGTH(BYTES) SET IN ACTUATOR PARAMETER.
- s0: VALUE IN FIRST BYTE OF ACTUATOR PARAMETER.

FIG. 20

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 4B | 00 | t0 | t1 | t2 | t3 | t4 | t5 |
| TRANSMISSION DATA FROM MANIPULATION DEVICE | dm | F3 | in | r0 | r1 | r2 | r3 | r4 | r5 | tx0 tx1 tx2 tx3 tx4 tx5
rx0 rx1 rx2 rx3 rx4 rx5

{
- in: 00 WHEN CONTROLLER IS NOT INITIALIZED, AND 5A AFTER RELEASED.
- tN: DATA TRANSMITTED TO CONTROLLER
- rM: DATA RECEIVED FROM CONTROLLER
}

FIG. 21

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 47 | 00 | ls | xx | xx | xx | xx | xx |
| TRANSMISSION DATA FROM MANIPULATION DEVICE | dm | F3 | in | xx | xx | sz | n0 | n1 | n2 | tx0 tx1 tx2 tx3 tx4 tx5
rx0 rx1 rx2 rx3 rx4 rx5

{
- in: 00 WHEN CONTROLLER IS NOT INITIALIZED, AND 5A AFTER RELEASED.
- ls: LIST NUMBER OF REQUIRED "LIST OF COMBINATIONS OF SIMULTANEOUSLY OPERABLE ACTUATORS."
- sz: LENGTH OF LIST (BYTES (ACTUATOR NUMBER IS REPRESENTED BY ONE BYTE)).
- nN: ACTUATOR NUMBER OF N NUMBER
}

FIG. 22

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 4D | 00 | s0 | s1 | s2 | s3 | s4 | s5 |
| TRANSMISSION DATA FROM MANIPULATION DEVICE | dm | F3 | in | o0 | o1 | o2 | o3 | o4 | o5 |

(Main body bytes 4–9 labeled tx0 tx1 tx2 tx3 tx4 tx5; Manipulation device bytes 4–9 labeled rx0 rx1 rx2 rx3 rx4 rx5)

in: 00 WHEN CONTROLLER IS NOT INITIALIZED, AND 5A AFTER RELEASED.
sN: NUMBER OF ACTUATOR FOR WHICH PARAMETER IS TO BE SET WHEN [42] [ACQUIRE BUTTON] COMMAND IS TRANSMITTED.
oN: RETURN "CONTENTS OF DATA TO BE TRANSMITTED WHEN BUTTON IS ACQUIRED" SET BEFORE THIS COMMAND IS EXECUTED.

FIG. 23

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 49 | 00 | an | sz | p0 | p1 | p2 | p3 |
| TRANSMISSION DATA FROM MANIPULATION DEVICE | dm | F3 | in | xx | xx | xx | xx | xx | xx |

(Main body bytes 4–9 labeled tx0 tx1 tx2 tx3 tx4 tx5; Manipulation device bytes 4–9 labeled rx0 rx1 rx2 rx3 rx4 rx5)

in: 00 WHEN CONTROLLER IS NOT INITIALIZED, AND 5A AFTER RELEASED.
aN: ACTUATOR NUMBER TO BE SET.
sz: DATA SIZE TO BE SET IN ACTUATOR PARAMETER (BYTES)

FIG. 25

| BYTE NO. | 1 | 2 | 3 | 4 | 5 | 6 | 7 | 8 | 9 |
|---|---|---|---|---|---|---|---|---|---|
| | | | | tx0 | tx1 | tx2 | tx3 | tx4 | tx5 |
| TRANSMISSION DATA FROM MAIN BODY | 01 | 42 | xx | t1 | t2 | t3 | t4 | t5 | t6 |
| TRANSMISSION DATA FROM MANIPULATION DEVICE | dm | id | in | b0 | b1 | a0 | a1 | a2 | a3 |
| | | | | rx0 | rx1 | rx2 | rx3 | rx4 | rx5 |
| TRANSMISSION DATA FROM MANIPULATION DEVICE | dm | F3 | in | b0 | b1 | a0 | a1 | a2 | a3 |

(tx5: REACTION DURING PERIOD IN WHICH CONTROLLER PARAMETER SETTING MODE IS OFF)

(rx5: REACTION DURING PERIOD IN WHICH CONTROLLER PARAMETER SETTING MODE IS ON)

tN: SET ACTUATOR PARAMETER (SET CONTENTS WITH [4D] COMMAND)
dM: DUMMY DATA
id: ID (1x ~ 9x.Ex) RETURNED AS PROTOCOL 1.0 MODE
in: 00 WHEN CONTROLLER IS NOT INITIALIZED, AND 5A AFTER RELEASED.
b0: UPPER BYTES OF BUTTON DEPRESSION DATA
b1: LOWER BYTES OF BUTTON DEPRESSION DATA
aN: NTH BYTE OF ANALOG LEVEL

FIG. 24

| BYTE NO. | 1 | 2 | 3 | 4 | 5 | 6 | 7 | 8 | 9 |
|---|---|---|---|---|---|---|---|---|---|
| TRANSMISSION DATA FROM MAIN BODY | 01 | 4A | 00 | sg | xx | xx | xx | xx | xx |
| TRANSMISSION DATA FROM MANIPULATION DEVICE | dm | F3 | in | xx | xx | xx | xx | xx | xx |

(columns 4–9 of main body row labeled tx0 tx1 tx2 tx3 tx4 tx5; manipulation device row labeled rx0 rx1 rx2 rx3 rx4 rx5)

in: 00 WHEN CONTROLLER IS NOT INITIALIZED, AND 5A AFTER RELEASED.

sg: SIMULTANEOUS UPDATE MODE FOR ACTUATOR PARAMETER. SPECIFY ON(=1)/OFF(=0)

GAME APPARATUS, GAME MACHINE MANIPULATION DEVICE, GAME SYSTEM AND INTERACTIVE COMMUNICATION METHOD FOR GAME APPARATUS

TECHNICAL FIELD

The present invention relates to a game apparatus, a game machine manipulation device, a game system, and an interactive communication method for a game apparatus, for example, which are suitably applied for the case in which any of various game machine manipulation devices are connected to a game apparatus so as to produce an appropriate presence in response to a particular signal from a game machine main body for reproducing a video recording medium.

BACKGROUND ART

Conventionally, there has been a game system which reproduces information on a game from a video recording medium in response to user's manipulation on a controller to progress the game.

Specifically, as illustrated in FIG. 1, in this game system GS, a game machine main body 27 contains a CD-ROM driver having a function of reproducing data recorded on a CD-ROM, which is a video recording medium. The game machine main body 27 has, on a top surface thereof, a lid member 28 which is closed after a CD-ROM is accommodated; an open/close switch 29 for opening and closing the lid member 28; a power supply switch 30 for supplying electric power; a reset switch 31 for returning the operation of the game machine main body 27 to an initial state; and a connection port 32 capable of connecting two manipulation devices.

Connecting a connector 20 of a game machine manipulation device CT1 to this connection port 32 makes it possible to perform interactive communications between the manipulation device CT1 and the game machine main body 27.

The game machine manipulation device CT1, as illustrated in FIG. 2, is formed in the shape of eyeglasses, and has a housing body composed of an upper case 2 and a lower case 3 which can be separated. This housing body is formed at both longitudinal ends with first and second manipulation supports 4, 5 which outwardly protrude just like horns so that a user can grip them with both hands for supporting. In a narrower middle portion of the housing body, a start select unit 6 including switches is provided for use in starting a game, selecting one from games, and so on. Also, first and second manipulation units 7, 8 are formed in a circular shape at horizontally symmetric positions on both sides of the housing body and a plurality of switches are arranged in substantially a central portion of each of the manipulation units 7, 8. Further, third and fourth manipulation units 9, 10 each comprising a plurality of switches, which allows the user to manipulate mainly with the index finger and middle finger, are disposed at horizontally symmetric positions on side wall surfaces in front portions of the housing body.

The start select unit 6 is a group of switches which include a start switch 11 and a select switch 12, both positioned between the first manipulation unit 7 and the second manipulation unit 8. The select switch 12 is provided for selecting the degree of difficulty or the like, for example, when a game is started, while the start switch 11 is a switch for actually starting the game.

The first manipulation unit 7 is structured to have a concavity 13 corresponding to a concave portion formed substantially in a cross shape in a central portion of the circular first manipulation unit 7, which was an end portion of the housing body, and windows 15 formed in the concavity 13 to make four key tops 14a, 14b, 14c, 14d extend therethrough from the inside to the outside. The windows 15 are positioned in conformity with the concavity 13 substantially in a cross shape, such that the heads of the four key tops 14a, 14b, 14c, 14d face each other in four directions.

The second manipulation unit 8 is formed with a concavity 16 corresponding to a concave portion formed substantially in a cross shape in a central portion of the circular second manipulation unit 8. Also, the second manipulation unit 8 has four cylinders 17 at upper, lower, left and right positions, respectively, of the cross-shaped concavity 16, each having an opening of a size that allows each of cylindrical key tops 16a, 16b, 16c, 16d to extend therethrough from the inside to the outside.

The four top keys 16a, 16b, 16c, 16d have readily viewable recognition symbols on their top surfaces, for example, symbols (marks) representative of functions such as ○, △, □, X or the like to allow the user to readily identify the functions of the respective switches. Also, these key tops 16a, 16b, 16c, 16d and the cylinders 17 are formed with unique protrusions or cut-outs at respective lower end portions thereof such that the key tops cannot be inserted into different cylinders 17 when assembly.

The third and fourth manipulation units 9, 10 are formed to protrude from the wall surfaces of front portions of the first and second manipulation units 7, 8. The third and fourth manipulation units 9, 10 include openings 18 which are two lines of two slits formed through the protruding wall surfaces in parallel, one above the other, and operation support manipulation switches formed by protruding elongated key tops 19a, 19b, 19c, 19d, which substantially fit into the openings 18, from the inside to the outside.

The game machine manipulation device CT1 having the structure as mentioned above is connected to the game machine main body 27, described above with reference to FIG. 1, with a predetermined connector 20. Further, the game machine main body 27 is connected to a monitor such as a television receiver or the like. In general, the user holds the manipulation device with both hands, manipulates manipulation buttons in the first to fourth manipulation units 7, 8, 9, 10 with fingers of both hands to instruct movements of an operation target such as a character or the like on the monitor screen for playing a game.

The game machine manipulation device CT1, having the structure as described above, is adapted to allow the user to manipulate the groups of buttons in the first to fourth manipulation units with fingers to instruct an operation target of a game to move on the screen of a monitor, thus advancing the game. During the play, the user experiences bodily sensation of how the game is advancing, only with visual sense obtained by viewing characters on the monitor screen and with acoustic sense obtained by listening to sounds generated from a speaker of the monitor. However, it is not sufficient to fully satisfy the user with the bodily sensation of the game.

In addition, in the conventional game machine manipulation device CT1, when any of the manipulation buttons in the first to fourth manipulation units 7, 8, 9, 10 is depressed to operate the game machine, data indicative of either ON or OFF is transmitted in accordance with the depression of the button as manipulation data to the game machine main body. With such a game machine manipulation device like CT1 adapted for digital control, it is difficult to provide a fine control such as an analog control.

BRIEF SUMMARY OF THE INVENTION

The present invention has been made in view of the problems mentioned above, and is intended to propose a game apparatus, a game machine manipulation device, a game system, and an interactive communication method for a game apparatus, which are capable of performing an optimal control, when any of various game machine manipulation devices having a variety of functions is connected to the game machine main body, by recognizing functions available from the connected game machine manipulation device by the game machine main body.

To solve the problems mentioned above, in the present invention, a game machine manipulation device has storing means for storing predetermined function information so as to transmit the function information to a game apparatus in response to an information request command from the game apparatus, while a game apparatus retrieves the function information possessed by the game machine manipulation device, selects predetermined function information from the retrieved function information to be set to the game machine manipulation device, thereby making it possible to perform an optimal control for the game machine manipulation device connected to the game apparatus.

Further, in the present invention, the game machine manipulation device has storing means for storing power consumption information of the response means so as to transmit the power consumption to the game apparatus in response to a information request command from the game apparatus, and moreover, the game apparatus transmits response means control data to the game machine manipulation device based on the power consumption information for the response means of the game machine manipulation device, thereby making it possible to perform an optimal control for the response means of the game machine manipulation device connected to the game apparatus.

BRIEF DESCRIPTION OF THE DRAWINGS

FIGS. 9A and 9B are cross-sectional view illustrating how a vibrator vibrates.

FIGS. 10A and 10B are characteristic graphs each illustrating the waveform of a current for driving a vibrator.

FIGS. 11A and 11B are characteristic graphs illustrating the waveform of a current for driving a vibrator.

FIG. 15 is a table showing a parameter setting mode ON/OFF command.

FIG. 16 is a table showing a controller information acquisition command.

FIG. 17 is a table showing a controller mode acquisition command.

FIG. 18 is a table showing a controller mode setting command.

FIG. 19 is a table showing an actuator information acquisition command.

FIG. 20 is a table showing an actuator status acquisition command.

FIG. 21 is a table showing a communication continuation command.

FIG. 22 is a table showing a command for acquiring a list of simultaneously operable actuators.

FIG. 23 is a table showing a command for setting details of a parameter for an actuator.

FIG. 24 is a table showing a controller button information acquisition command.

FIG. 25 is a table showing an actuator parameter setting command.

FIGS. 31A to 31F are state transition diagrams illustrating an example of a communication for acquiring controller information and so on.

BEST MODE FOR CARRYING OUT THE INVENTION

One embodiment of the present invention will hereinafter be described in detail with reference to the accompanying drawings.

Figure 3:
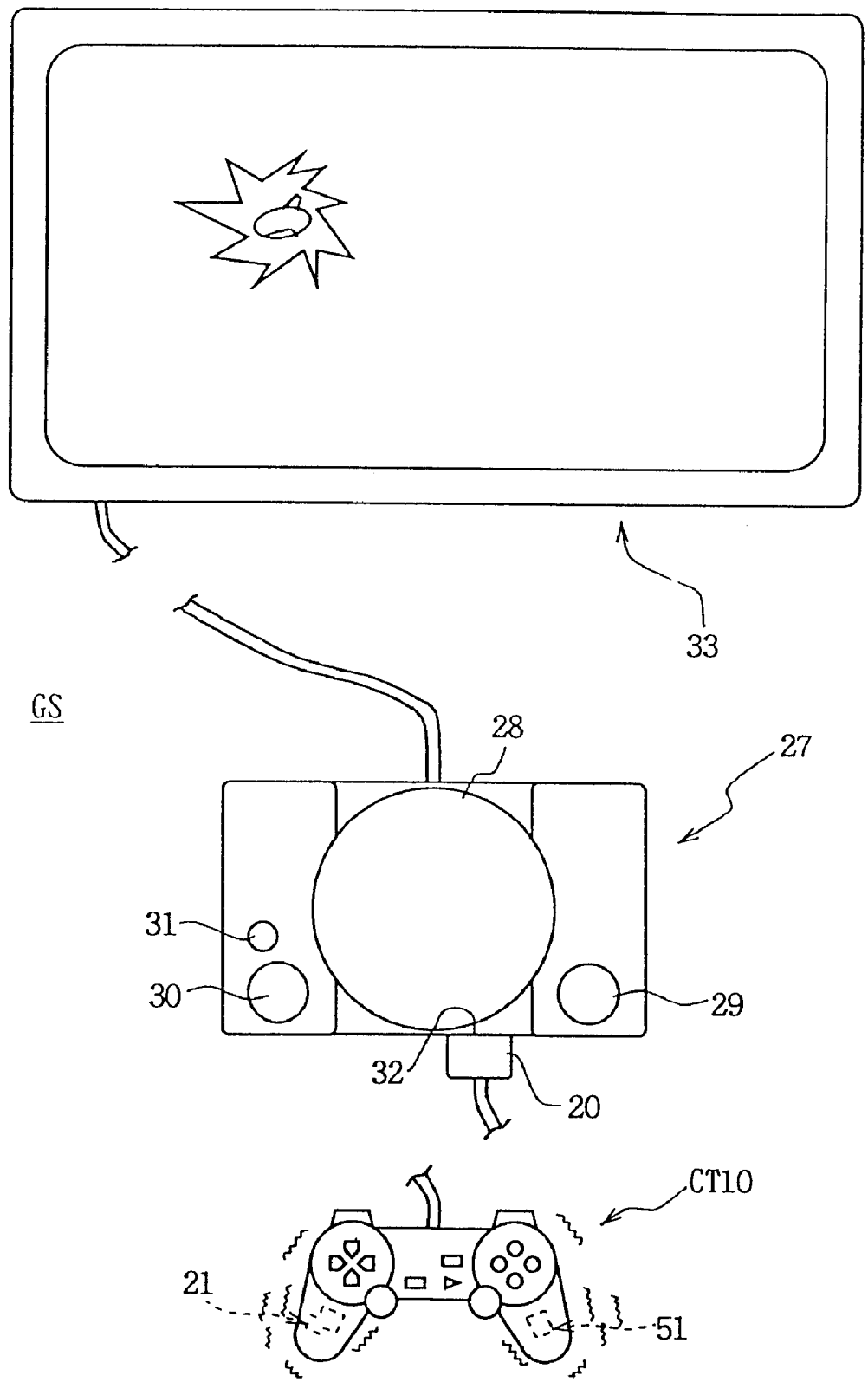
FIG. 3 is a plan view illustrating a general configuration of a game system according to the present invention.

In FIG. 3, a game system GS has a game machine main body 27; a game machine manipulation device (controller) CT10 for setting the contents of a game and inputting instructions according to the progress of the game to the game machine main body 27; and a monitor 33 for visually displaying how the game goes on.

The game machine main body 27 contains a CD-ROM driver having a function of reproducing data recorded on a CD-ROM, which is a video recording medium. The top surface of the game machine main body 27 is provided with a lid member 28 for closing after a CD-ROM is accommodated; an open/close switch 29 for opening and closing the lid member 28; a power supply switch 30 for supplying electric power; a reset switch 31 for returning the operation of the game machine main body 27 to an initial state; and a connection port 32 capable of connecting two manipulation devices.

Connecting a connector 20 of the game machine manipulation device CT10 to this connection port 32 makes it possible to perform interactive communications between the manipulation device CT10 and the game machine main body 27.

Figure 4:
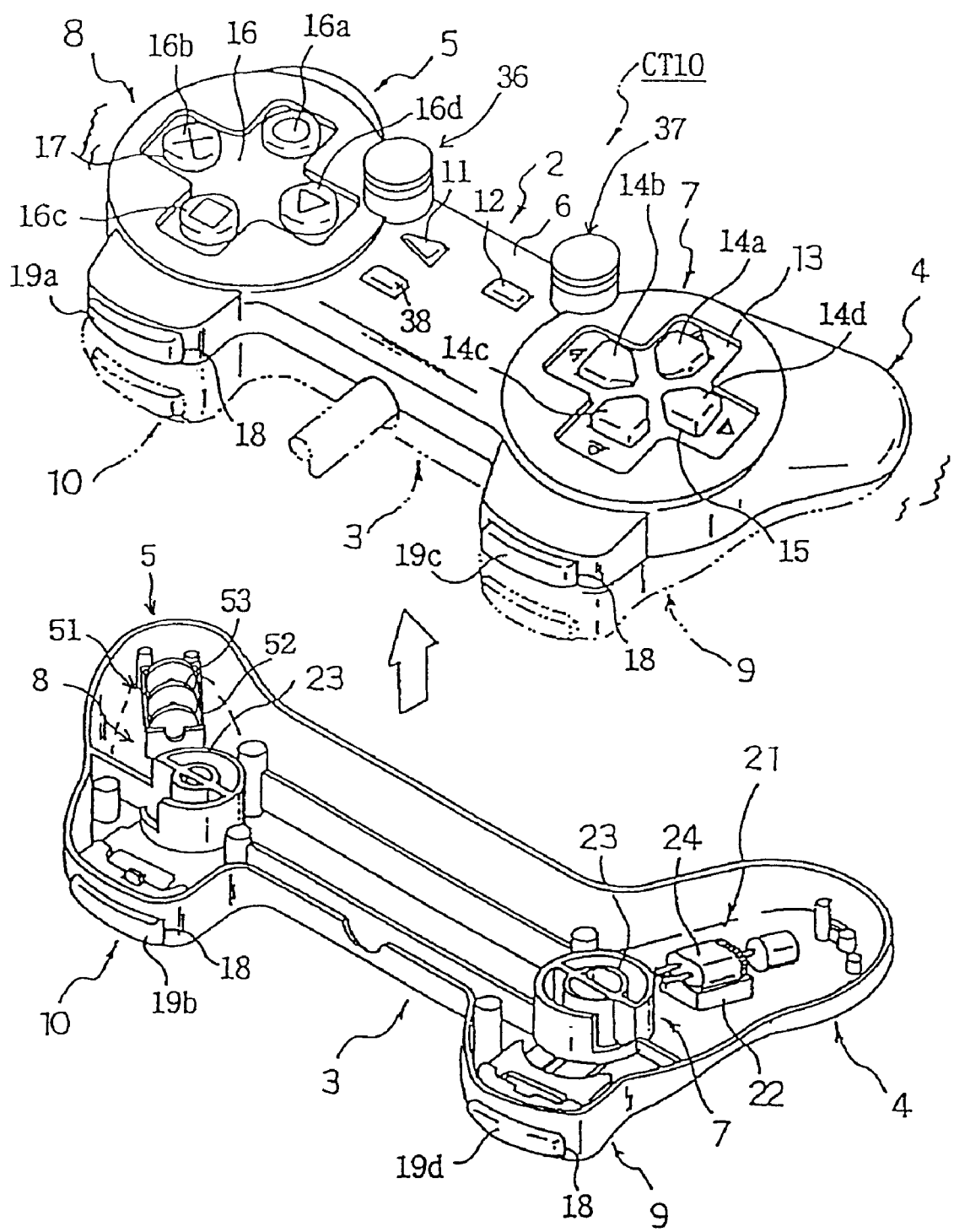
FIG. 4 is a perspective view illustrating the structure of a game machine manipulation device.

The game machine manipulation device CT10, as illustrated in FIG. 4, is formed in the shape of eyeglasses, and has a housing body composed of an upper case 2 and a lower case 3 which can be separated. Both longitudinal ends of this housing body is provided with first and second manipulation supports 4, 5 which outwardly protrude just like horns so that the user can grip them with both hands for supporting. In a narrower middle portion of the housing body, a start select unit. 6 including switches is provided for use in starting a game, selecting one from games, and so on. Also, first and second manipulation units 7, 8 are formed in a circular shape at horizontally symmetric positions on both sides of the housing body, and a plurality of switches are arranged in substantially a central portion of each of the manipulation units 7, 8. Further, third and fourth manipulation units 9, 10 each comprising a plurality of switches, which allows the user to manipulate mainly with the index finger and middle finger, are disposed at horizontally symmetric positions on side wall surfaces in the front of the housing body.

The start select unit 6 is as a group of switches which include a start switch 11 and a select switch 12, both positioned between the first manipulation unit 7 and the second manipulation unit 8. The select switch 12 is provided for selecting the degree of difficulty or the like, for example, when starting a game, while the start switch 11 is a switch for actually starting the game.

The first manipulation unit 7 is structured to have a concavity 13 corresponding to a concave portion formed substantially in a cross shape in a central portion of the circular first manipulation unit 7, which was an end portion of the housing body, and windows 15 formed in the concavity 13 for four key tops 14a, 14b, 14c, 14d to extend therethrough from the inside to the outside. The windows 15 are positioned in conformity with the concavity 13 substantially in a cross shape, such that the heads of the four key tops 14a, 14b, 14c, 14d face each other in four directions.

The second manipulation unit 8 is provided with a concavity 16 corresponding to a concave portion substantially in a cross shape in a central portion of the circular second manipulation unit 8. Also, the second manipulation unit 8 has four cylinders 17 at upper, lower, left and right positions, respectively, of the cross-shaped concavity 16, each having an opening of a size that allows each of cylindrical key tops 16a, 16b, 16c, 16d to extend therethrough from the inside to the outside.

The four top keys 16a, 16b, 16c, 16d have readily viewable recognition symbols on their top surfaces, for example, symbols (marks) representative of functions such as ○, Δ, □, X or the like so as to allow the user to readily identify the functions of the respective switches. Also, these key tops 16a, 16b, 16c, 16d and the cylinders 17 are formed with unique protrusions or cut-outs in lower end portions thereof such that the key tops cannot be inserted into different cylinders 17 when assembly.

The third and fourth manipulation units 9, 10 are formed to protrude from the wall surfaces of the front of the first and second manipulation units 7, 8. The third and fourth manipulation units 9, 10 include openings 18 which are two lines of two slits formed through the protruding wall surfaces in parallel, one above the other, and operation support manipulation switches formed by protruding therethrough elongated key tops 19a, 19b, 19c, 19d, which substantially fit into the openings 18, from the inside to the outside.

The game machine manipulation device CT10 having the structure as mentioned above is connected to the game machine main body 27, described above in connection with FIG. 3, with a predetermined connector 20. Further, the game machine main body 27 is connected to a monitor 33 such as a television receiver or the like. In general, the user holds the manipulation device with both hands, manipulates manipulation buttons of the first to fourth manipulation units 7, 8, 9, 10 with fingers of both hands to instruct movements of an operation target such as a character or the like on the monitor screen for playing a game.

Figure 5:
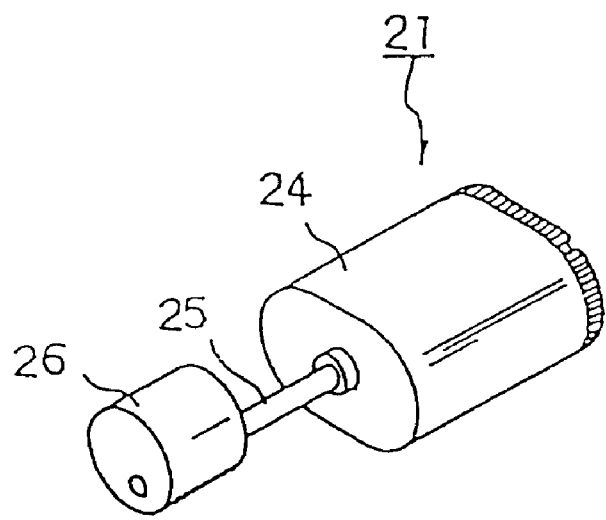
FIG. 5 is a perspective view illustrating a motor of a response means.

Here, the game machine manipulation device CT10 illustrated in FIG. 4 has response means 21 and 51 each in a predetermined space inside the housing body. The response means 21 is disposed on a response means positioning place 22 into a first manipulation support 4 of the lower case 3. As illustrated in FIG. 5, the response means 21 comprises a motor 24, and a cylindrical rotator 26 mounted to the rotating shaft 25 of the motor 24 at a position deviated from the center thereof, i.e., at an eccentric position. With this manner of mounting, as the motor 24 is rotated, the rotator 26 eccentrically rotates to generate vibrations.

Figure 6:
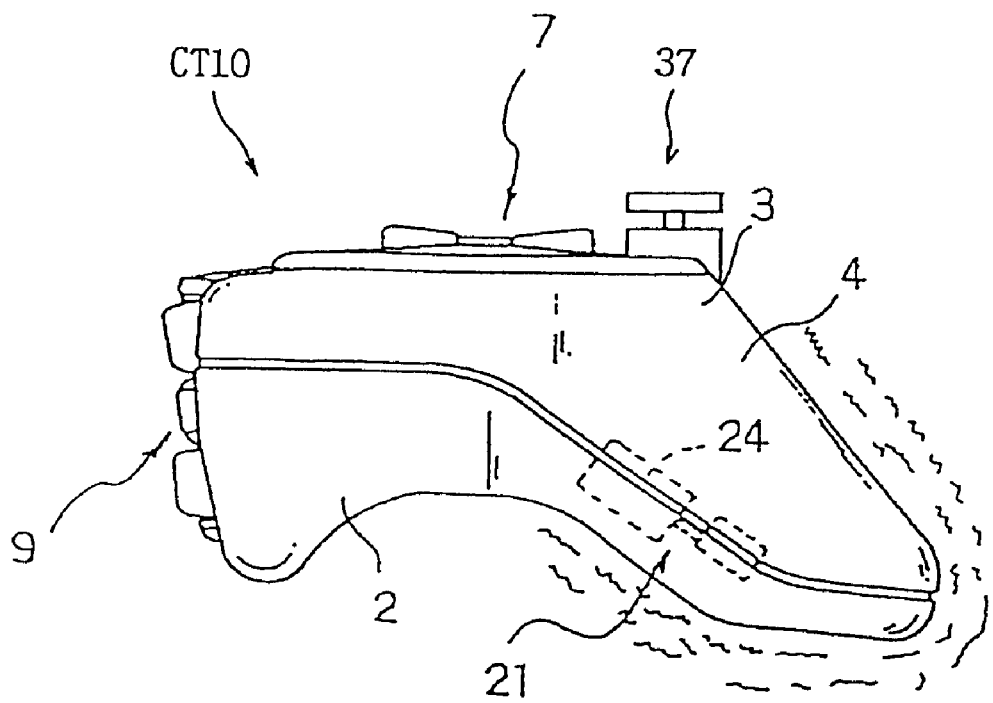
FIG. 6 is a side view illustrating how a support is vibrated by a motor.

The vibrations vibrate not only the first manipulation support 4 but also the housing comprising the lower case 3 and the upper case 2 to vibrate the entire manipulation device, as illustrated in FIG. 6. In this way, dynamic bodily sensation can be given to the user who is manipulating the game machine manipulation device CT10. The vibrations generated by the eccentric rotation of the rotator 26 can be arbitrarily varied by adjusting the rotating speed and torque of the motor 24, thereby changing the magnitude of the response means 21.

Figure 7:
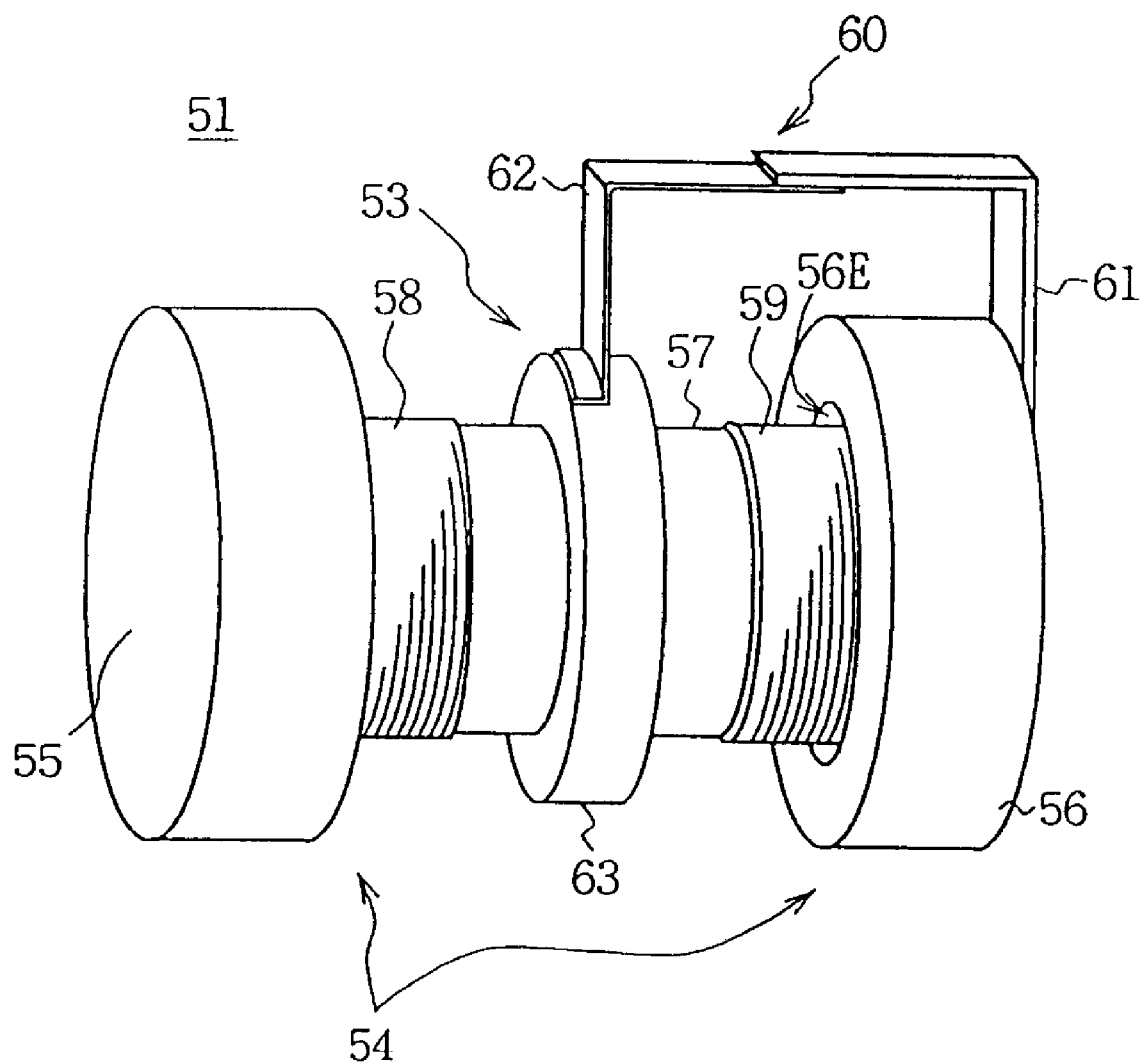
FIG. 7 is a perspective view illustrating the structure of a voice coil type response means.

Also, in the game machine manipulation device CT10 illustrated in FIG. 4, the response means 51 is disposed on a response means positioning place 52 into the second manipulation support 5 of the lower case 3. This response means 51 has a vibrator 53 for linearly reciprocal movements. More specifically, as illustrated in FIG. 7, the response means 51 has a weight 63 fixed substantially at the center of an cylindrical coil bobbin 57 to form the vibrator 53, and also has a stator 54 composed of two magnetic materials 55, 56 for reciprocally vibrating the vibrator 53 in the axial direction of the coil bobbin 57.

Both ends of the coil bobbin are wound with conductive wires in opposite directions to each other to form a first coil 58 and a second coil 59. The coil bobbin 57 thus provided with the coils 58 and 59 at the right and left ends thereof has both ends loosely fitted in loose fit holes 55E and 56E, respectively, which are formed in the magnetic materials 55 and 56, respectively. The suspender 60 comprising the support member 61 and a leaf spring 62 keeps a state capable of performing reciprocal movements.

Figure 8:
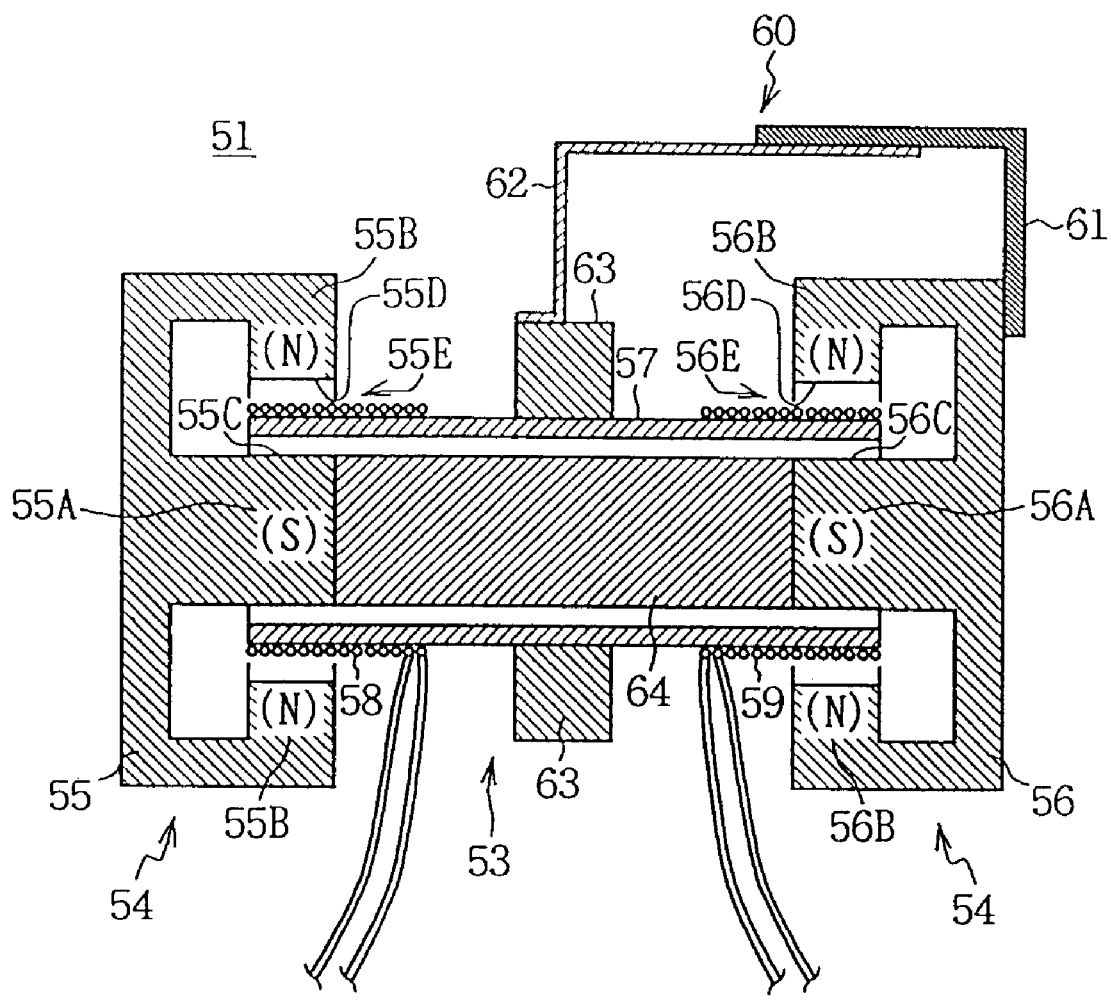
FIG. 8 is a cross-sectional view illustrating the structure of a voice coil type response means.

FIG. 8 illustrates a cross-section of the response means 51. The two magnetic materials 55 and 56 forming the stator 54 each has the outer appearance substantially in a cylindrical shape. Cylindrical magnetic poles (S poles) 55A and 56A are protrusively formed along the central axial lines of the magnetic materials 55 and 56, respectively. The magnetic materials 55 and 56 are connected by fixedly inserting a core 64 between the magnetic poles 55A and 56A. In this connection, a member for connecting the magnetic materials 55 and 56 is not limited to the core 64, but any non-magnetic resin member may be used instead.

Annularly protruding magnetic poles (N poles) 55B and 56B are formed opposite to the peripheral surface of the respective magnetic poles 55A and 55B with a predetermined spacing therebetween. Therefore, in the magnetic material 55, a magnetic flux density B exists in a gap (the loose fit hole 55E) between the magnetic pole 55A and the magnetic pole 55B, while in the magnetic material 56, the magnetic flux density B exists in a gap (the loose fit hole 56E) between the magnetic pole 56A and the magnetic pole 56B. One end of the coil bobbin 57, which forms part of the vibrator 53, is loosely fitted in the loose fit hole 55E of the magnetic material 55, wherein the coil 58 wound around the end portion is positioned across the magnetic flux. Similarly, in the magnetic material 56, the other end of the coil bobbin 57, which forms part of the vibrator 53, is loosely fitted in the loose fit hole 56E of the magnetic material 56, wherein the coil 59 wound around the other end is positioned across the magnetic flux.

Assume herein that an initial state of the vibrator 53 is such that its end at which the coil 58 is formed shift in the left direction so as to abut on the magnetic material 55, as illustrated in FIG. 9A. When the coil 58 is applied with a driving current $I_{58}$, for example as illustrated in FIG. 10A, and the coil 59 is applied with a driving current $I_{59}$ as illustrated in FIG. 10B, the driving current $I_{58}$ flows through the coil 58, while the driving current $I_{59}$ does not flow through the coil 59 at the initial state (time t=0).

Thereby, a force $F=I_{58} \times B$ is applied to the coil 58, so that the vibrator 53 moves to the right (i.e., toward the magnetic material 56), and the vibrator 53 stops at the position at which the end of the vibrator 53 formed with the coil 59 abuts on the magnetic material 56, as illustrated in FIG. 9B.

Then, at time t=T, the driving current $I_{59}$ flows through the coil 59 as illustrated in FIG. 10B, while the driving current $I_{58}$ does not flow through the coil 58 as illustrated in FIG. 10A. The coil 59 is therefore applied with a force –F because the coils 58 and 59 are wound in opposite directions to each other. As a result, the vibrator 53 moves to the left (i.e., toward the magnetic material 55), thus returning to the initial state illustrated in FIG. 9A.

Afterwards, the driving currents $I_{58}$ and $I_{59}$ are alternately conducted to be applied to the coil 58 and 59 in a similar manner, thereby causing the vibrator 53 to reciprocally move, that is, vibrate between the magnetic materials 55 and 56.

In this connection, changing the periods of the driving currents $I_{58}$ and $I_{59}$ can change the vibrating frequency of the vibrator 53. Also, changing the current values of the driving currents $I_{58}$ and $I_{59}$ can change the force F (that is, acceleration) applied to the vibrator 53.

Instead of the method of turning on and off constant current values as illustrated in FIGS. 10A and 10B, the waveforms of the driving currents $I_{58}$ and $I_{59}$ applied respectively to the coils 58 and 59 are changed in an analog manner as illustrated in FIGS. 11A and 11B. Specifically, for each of the driving current $I_{58}$ and $I_{59}$, each period T in which the driving currents $I_{58}$ and $I_{59}$ are conducted is further segmented into sub-periods, and a different current value is set for each sub-period. Then, these current values are transferred as packet data from the game machine main body 27 to the game machine manipulation device CT10, thereby allowing the vibrator 53 of the response means 51 to generate vibrations which have gradually increasing acceleration. In this way, it is possible to make the response means 51 generate a variety of vibrations having different magnitudes, amplitudes, vibration frequencies and so on.

For example, a variety of values can be set to current value data transferred to the game machine manipulation device CT10 as the packet data, depending on the degree of impact applied to an operation target in a game under progress in the game machine main body 27. In addition, the number of current value data allocated in one packet can be set to any of various values. Thus, by setting a variety of driving current waveforms depending on how the game is progressing, large current values may be alternately applied to the coils 58 and 59 only for short time periods to generate large vibrations such as impacts in the game machine manipulation device CT10, for example, in a scene where an operation target is applied with a large impact. On the other hand, in a scene where an operation target generates small and continuous vibrations, for example, such as those generated in an idling automobile, smaller current values may be alternately applied to the coils 58 and 59 for a long time period, thereby generating vibrations in the game machine manipulation device CT10 just like vibrations caused by an idling automobile.

Figure 12:
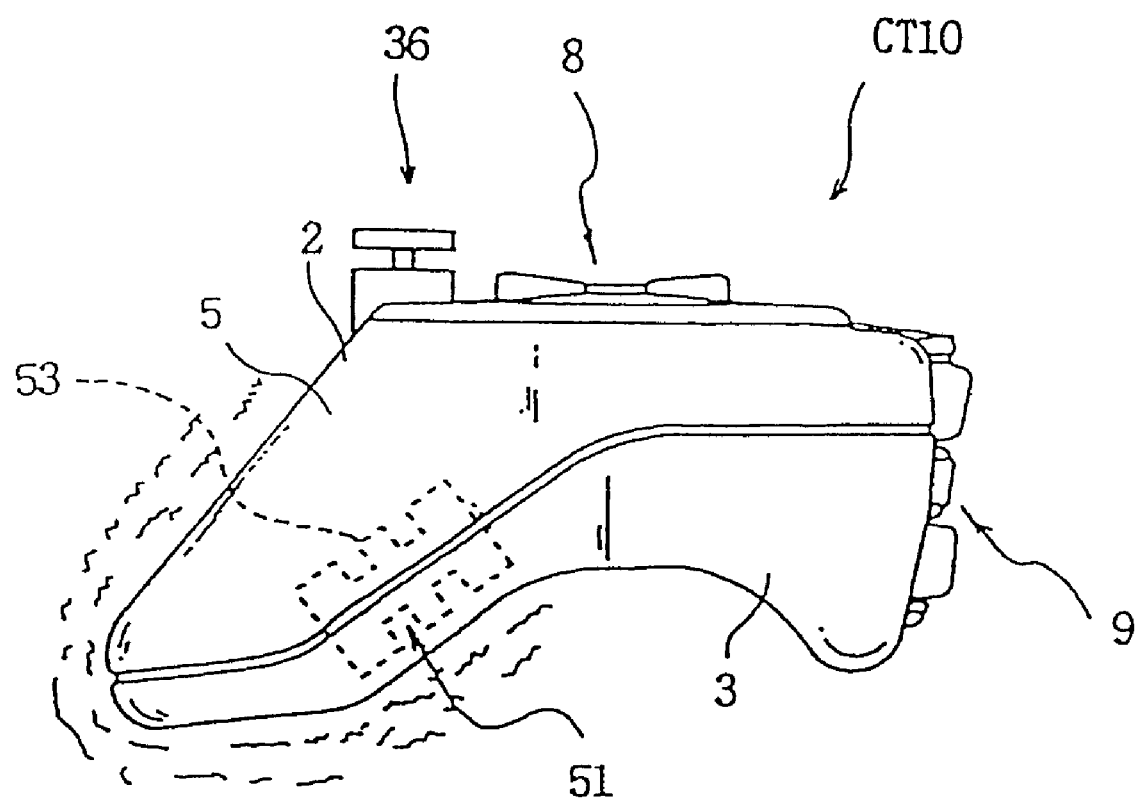
FIG. 12 is a side view illustrating how a manipulation device is vibrated by a vibrator.

As described above, vibrations generated by the response means 51 is transmitted not only to the second manipulation support 5 but also to the housing including the lower case 3 and the upper case 2 to vibrate the entire device, as illustrated in FIG. 12, thereby making it possible to give dynamic bodily sensation to the user who is manipulating the game machine manipulation device CT10.

As a result of mounting the response means 21 and 51 into the first manipulation support 4 and the second manipulation support 5, respectively, of the lower case 3, the response means 21 and/or 51 are vibrated by a particular response signal from the game machine main body 27 to vibrate the entire game machine manipulation device CT10 for a constant time period, depending on the type of game, when the game machine manipulation device CT10 and the game machine main body 27 are connected to a monitor 33 such as a television receiver or the like to play a game as illustrated in FIG. 3. Such vibrations may be preferably accompanied when knocking down an opponent in a fighting game, when hitting the mark in a shooting game, when an aircraft being an operation target is attacked on the screen, and so on. In this way, the entire manipulation device vibrates in response to operations made by the user with the manipulation buttons, to feed the contents of a game under progress back to the user playing the game, thereby making it possible to improve the presence.

For driving the response means 21 and 51 to vibrate the game machine manipulation device CT10 as mentioned above, the game machine manipulation device CT10 and the game machine main body 27 need an interactive communication capability. The interactive communication capability can be realized by connecting the game machine main body 27 to a connector 20 which provides interactive serial communications with the game machine manipulation device CT10, as described in FIG. 13. It should be noted that this embodiment is described in connection with a configuration including only one game machine manipulation device CT10 connected to the game machine main body 27.

In the game machine manipulation device CT10, the interactive communication capability is implemented by an I/O interface SIO for providing serial communications with the game machine main body 27; a parallel I/O interface PIO for inputting manipulation data from a plurality of manipulation buttons; a one-chip microcomputer (hereinafter, referred to as "the microcomputer") including a CPU, a RAM and a ROM; and a driver 34 for vibrating the response means 21 and 51. The motor 24 of the response means 21 is rotated by a voltage and a current supplied from the driver 34. The coils 58 and 59 constituting the vibrator 53 of the response means 51 are vibrated by a voltage and a current supplied from the driver 34.

The game machine main body 27 is provided with a serial I/O interface SIO for performing serial communications with the game machine manipulation device CT10. When the connector 20 of the game machine manipulation device CT10 is connected to the game machine main body 27, the serial I/O interface SIO of the game machine main body 27 is connected to the serial I/O interface SIO of the game machine manipulation device CT10 through this connector 20, thereby providing interactive communication means, i.e., interactive serial communications. Other details in the game machine main body 27 is omitted.

Signal lines and control lines for interactive serial communications include a data transmission signal line TXD (Transmit X' for Data) for transmitting data from the game machine main body 27 to the game machine manipulation device 10; a data transmission signal line RDX (Received X' for Data) for transmitting data from the game machine manipulation device CT10 to the game machine main body 27; a serial synchronization clock signal line SCK (Serial Clock) for extracting data from the respective data transmission signal lines TXD, RDX; a control line DTR (Date Terminal Ready) for establishment, interruption and so on of communications with the game machine manipulation device CT10 being the terminal side; and a flow control line DSR (Data Set Ready) for transferring a large amount of data.

Figure 13:
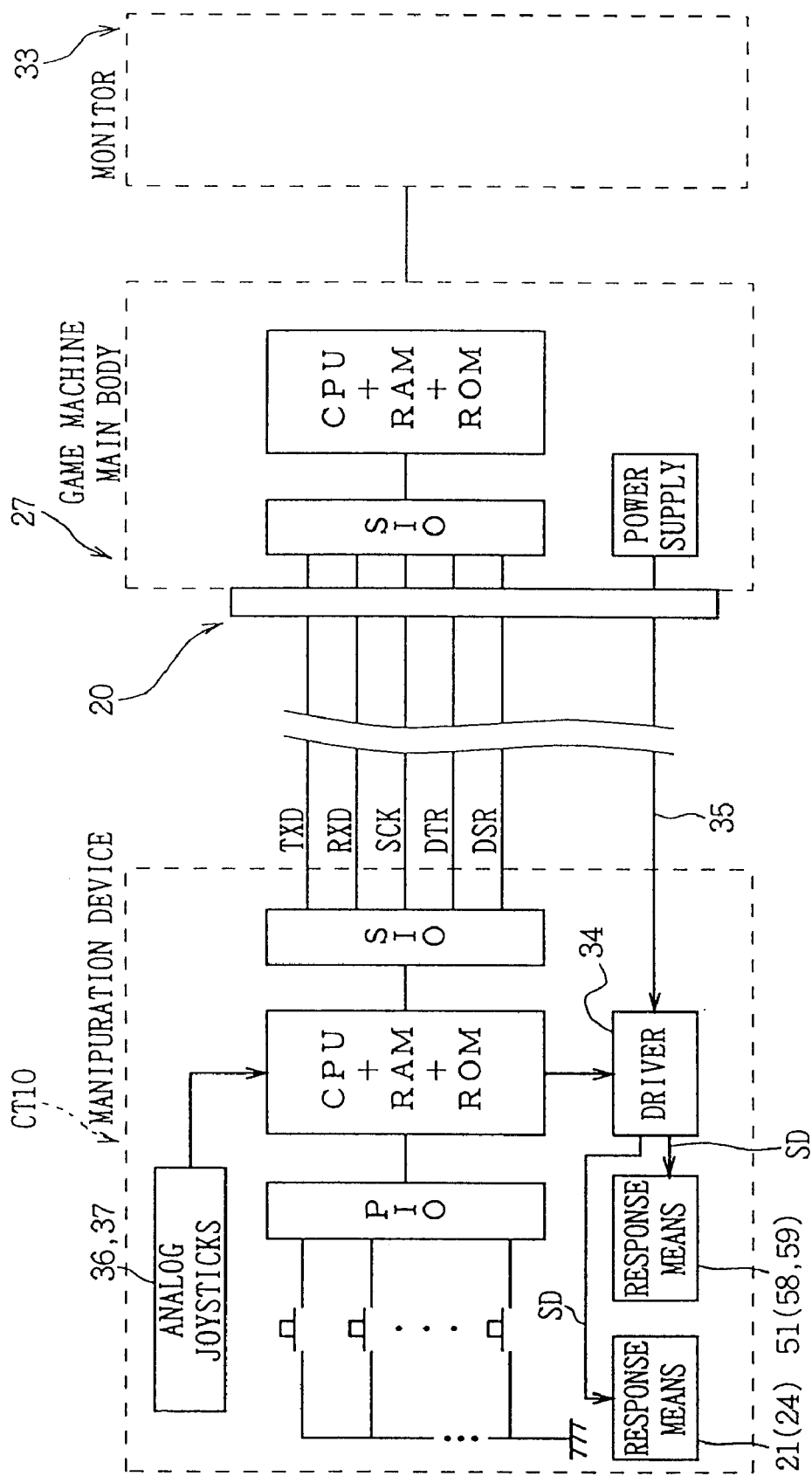
FIG. 13 is a block diagram illustrating the configuration of a game machine main body and a game machine manipulation device.

The cable constituting the signal lines and control lines for interactive serial communications also includes a power supply cable 35 which is directly extracted from a power supply of the game machine main body 27 in addition to the signal lines and control lines, as illustrated in FIG. 13. The power supply cable 35 is connected to a driver 34 in the game machine manipulation device CT10 for supplying electric power for vibrating the response means 21 and 51.

An interactive serial communication procedure for the configuration described above is started, for example, when the game machine main body 27 illustrated in FIG. 13 communicates with the game machine manipulation device CT10. For retrieving manipulation data (button information) associated with manipulation buttons of the first to fourth manipulation units 7, 8, 9, 10, the game machine main body 27 first confirms by the control line DTR that it has been selected, and subsequently enters in a wait state for waiting for the reception of data on the signal line TXD. Subsequently, the game machine main body 27 sends an identification code indicative of the game machine manipulation device CT10 onto the data transmission signal line TXD. This causes the game machine manipulation device CT10 to receive this identification code from the signal line TXD.

Since the identification code indicates the game machine manipulation device CT10, the game machine manipulation device CT10 starts a communication with the game machine main body 27. More specifically, control data and so on are transmitted from the game machine main body 27 through the data transmission signal line TXD to the game machine manipulation device CT10, whereas manipulation data and so on generated by manipulations with manipulation buttons are transmitted from the game machine manipulation device CT10 through the data transmission signal line RDX to the game machine main body 27. In this way, an interactive serial communication is performed between the game machine main body 27 and the game machine manipulation device CT10. The communication is terminated when the game machine main body 27 outputs selection stop data through the control line DTR.

Thus, if the interactive serial communication capability is provided, manipulation data mainly associated with manipulation buttons can be transmitted from the game machine manipulation device CT10 to the game machine main body 27, while dynamic transmission data for vibrating the response means 21 and 51 can be sent from the game machine main body 27 through the data transmission signal line TXD to the game machine manipulation apparatus CT10. The dynamic transmission data for vibrating the response means 21 and 51 has been previously set depending on a game CD-ROM loaded in the game machine main body 27, and is fed back from the game machine main body 27 to the game machine manipulation device CT10 in accordance with movements of an operation target in a game manipulated by the user who is playing the game through dynamic transmission for a fixed time.

Here, as a game manipulation device to be connected to the game machine main body 27, for example, the game machine manipulation device CT10 illustrated in FIG. 4 transmits digital control data generated by manipulating the manipulation buttons of the manipulation units 7, 8, 9 and 10 to the game machine main body 27, and transmits analog control data generated by manipulating analog joysticks 36, 37 to the game machine main body 27. These modes can be selected by the user manipulating a mode switch button 38 of the game machine manipulation device CT10. Alternatively, the modes may be selected by software in a CD-ROM loaded in the game machine main body 27.

Figure 1:
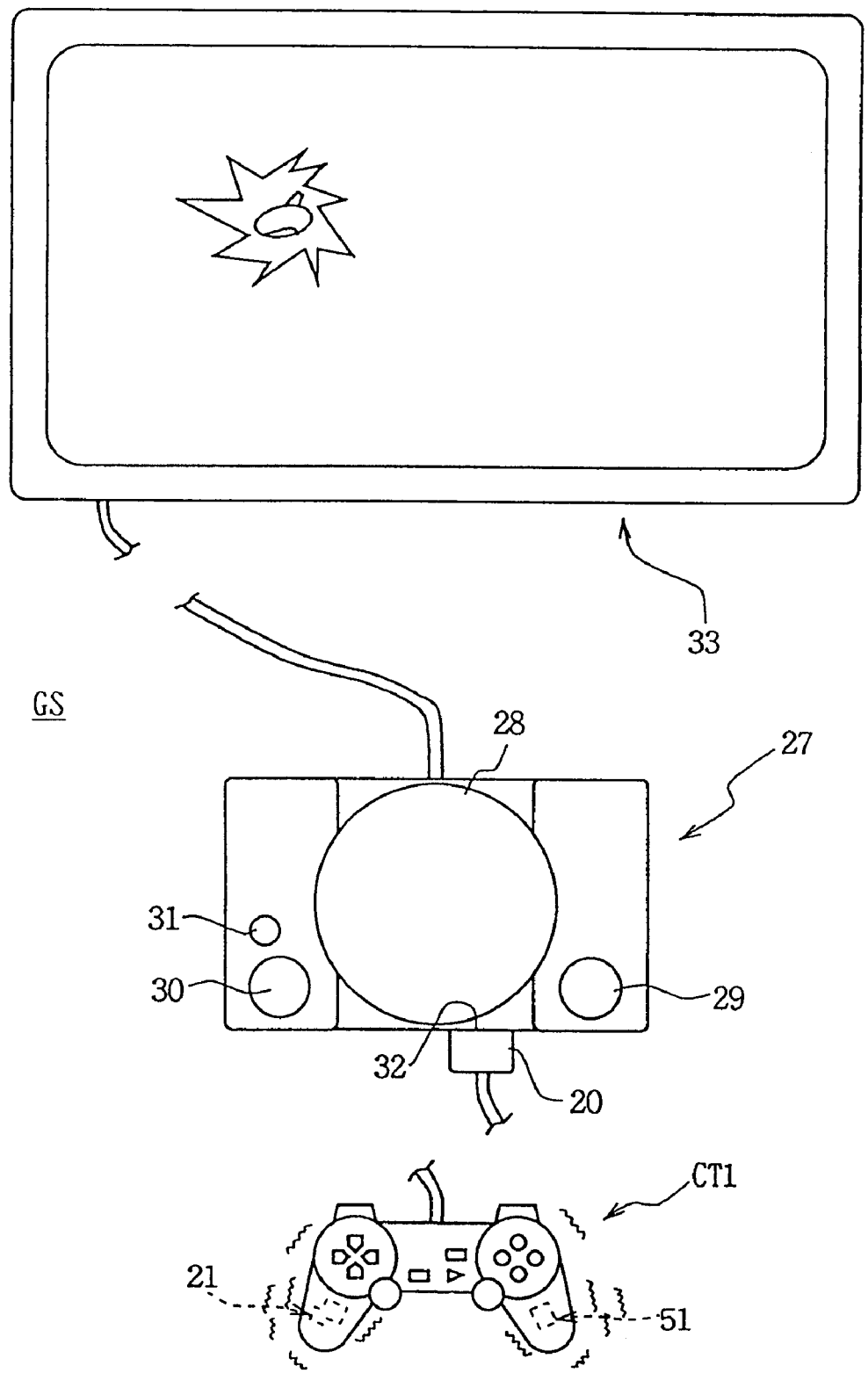
FIG. 1 is a plan view illustrating a general configuration of a conventional game system.
Figure 2:
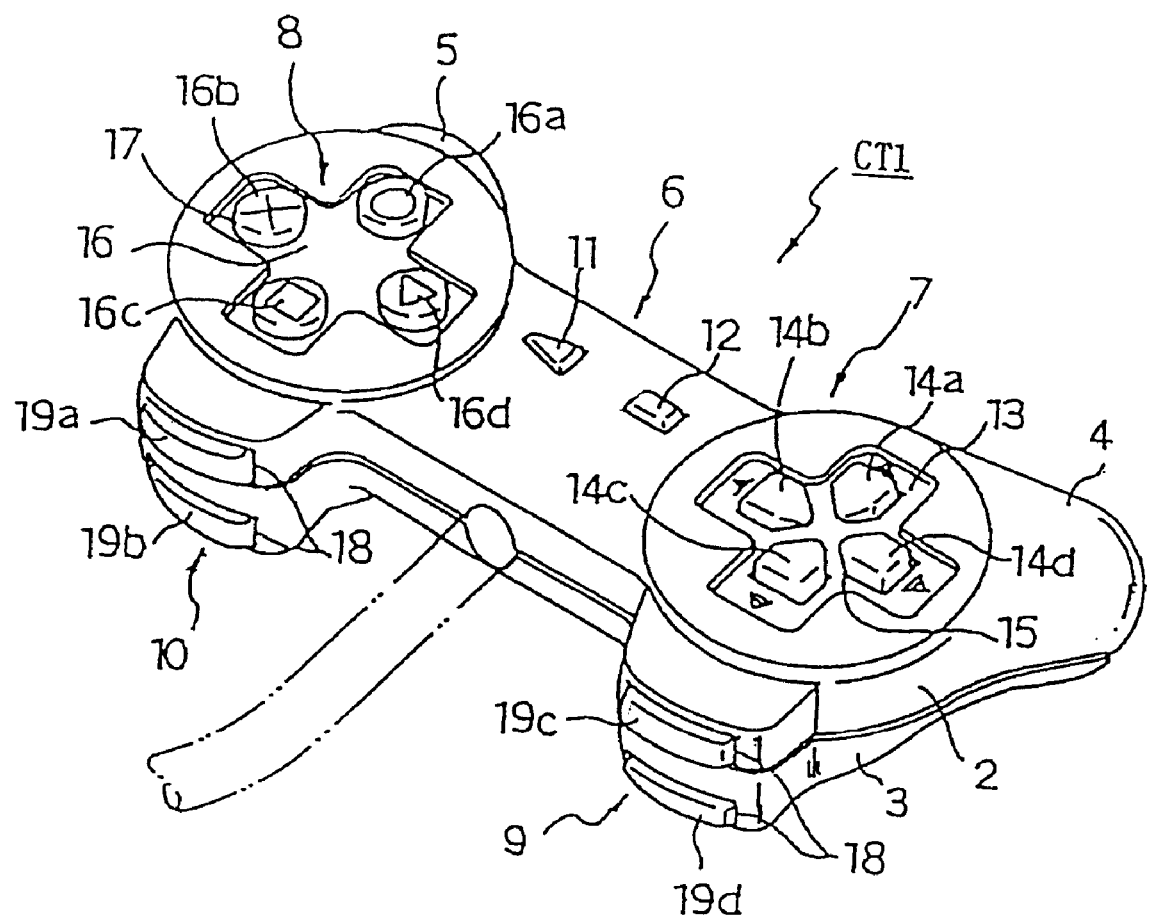
FIG. 2 is a perspective view illustrating the structure of a conventional game machine manipulation device.

The game system GS is configured to be connectable with a variety of game machine manipulation devices such as a game machine manipulation device CT1 (FIG. 2) having only a digital mode, other than the game machine manipulation device CT10 which allows to select the digital mode and analog mode mentioned above.

Therefore, the game machine main body 27 can inquire certain functions of a game machine manipulation device (CT10 or the like) connected to the game machine main body 27 and set a variety of parameters to the game machine manipulation device by transmitting a variety of commands to the game machine manipulation device.

Figure 14:
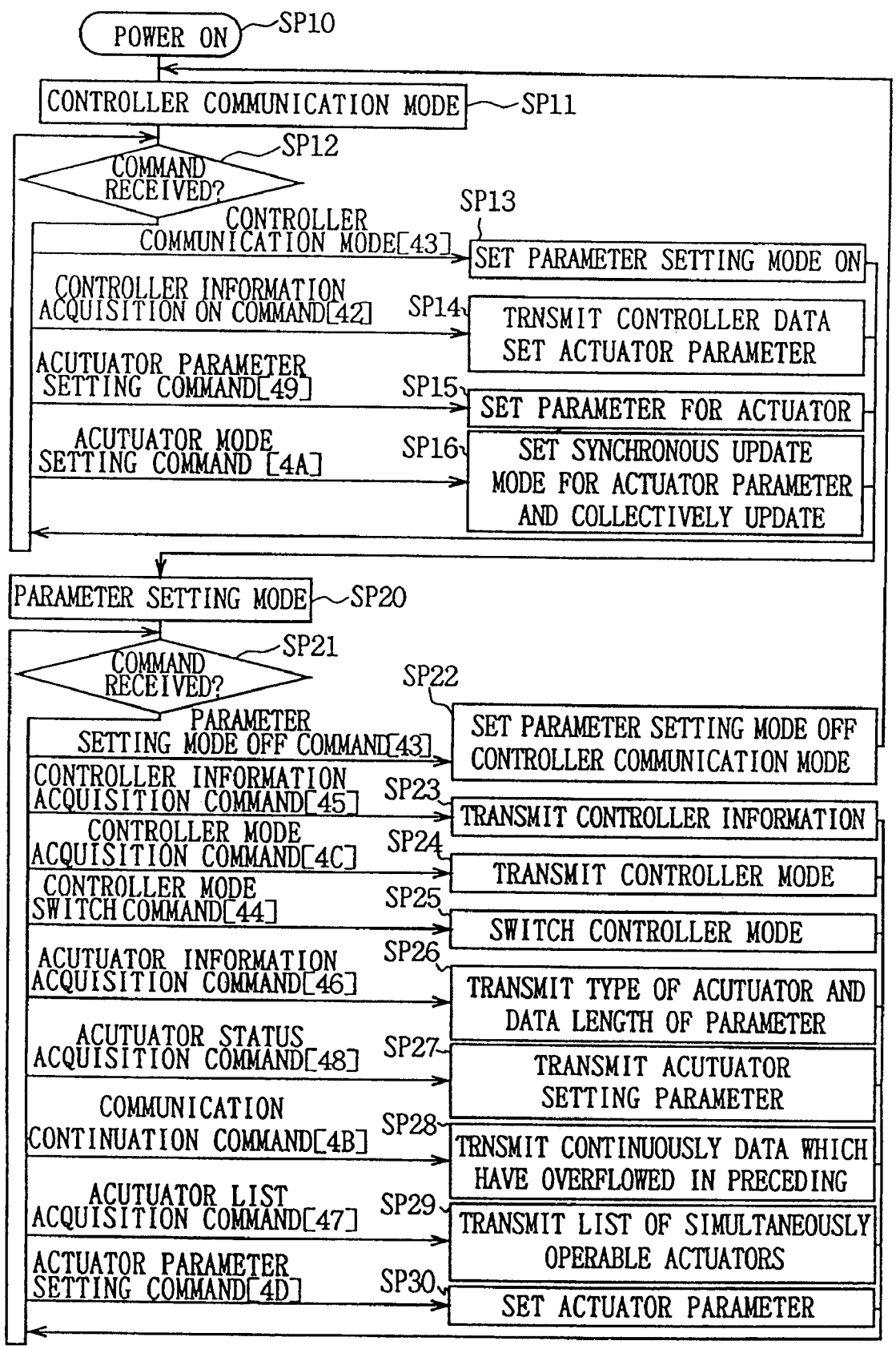
FIG. 14 is a flow chart illustrating a communication processing procedure of a controller.

In this case, the game machine manipulation device CT10 communicates with the game machine main body 27 in accordance with a communication processing procedure illustrated in FIG. 14. Specifically, in FIG. 14, when the game machine main body 27 is powered on through the power supply switch under the state of being connected to the game machine manipulation device CT10, the game machine main body 27 and the game machine manipulation device CT10 enter a communication mode at step SP11 for making a communication therebetween. Then, the game machine manipulation device CT10 proceeds to step SP12 to wait for a command from the game machine main body 27.

Here, the game machine main body 27 can transmit a variety of commands to the game machine manipulation device CT10 as packet data for each vertical period of a video signal. Then, as the power supply switch of the game machine main body 27 is turned on, the game machine main body 27 first transmits a command to instruct the game machine manipulation device to set ON a parameter setting mode, which is a communication command between itself and a controller (game manipulation device), to the game machine manipulation device as an initial setting.

This command comprises nine-byte packet data as shown in the upper column of FIG. 15. The command has a first byte allocated to data 0x01 (hereinafter, simply denoted as "01", omitting "0x" representative of a hexadecimal number) indicative of a command for a game machine manipulation device; a second byte allocated to data "43" indicative of a command for set ON/OFF a parameter setting for the game machine control device (controller); a third byte allocated to data "00" corresponding to the second data "43"; and a fourth byte allocated to "1" when the parameter setting mode is set ON for the controller (the game machine manipulation device). Note that, data in a fifth byte through a ninth byte are variable length data having a length in a range of two bytes to six bytes, so that a variety of data are allocated therein as required.

Thus, the CPU of the game machine manipulation device CT10 proceeds from step SP13 to step SP20 in FIG. 14, upon receiving a parameter setting ON command shown in FIG. 15, to enter the parameter setting mode for the game machine manipulation device CT10. At subsequent step SP21, the CPU determines a command subsequently received thereby.

In the parameter setting mode, the CPU of the game machine manipulation device CT10 proceeds to step SP23 in FIG. 14 to transmit information on the game machine manipulation device CT10 to the game machine main body 27, when data transmitted from the game machine main body 27 to the game machine manipulation device CT10 is a controller (game machine manipulation device) information acquisition command shown in the upper column of FIG. 16.

More specifically, the controller information acquisition command transmitted from the game machine main body 27 to the game machine manipulation device CT10 comprises nine-byte packet data, as shown in the upper column of FIG. 16, which has a first byte allocated to data "01" indicative of a command for the game machine manipulation device; a second byte allocated to data "45" indicating that this command is a command for acquiring (requesting) information on the game machine manipulation device (controller); a third byte allocated to data "00" corresponding to data "45" in the second byte; and a fourth byte to a ninth byte loaded with tx0–tx5 which are fixed-length data of six bytes. Data allocated to the fourth to ninth bytes are indefinite.

Thus, the CPU of the game machine manipulation device CT10, upon receiving the controller information acquisition command shown in the upper column of FIG. 16, proceeds from step SP21 to step SP23 in FIG. 14 to return information on the game machine manipulation device CT10 to the game machine main body 27 as transmission data shown in the lower column of FIG. 16. Specifically, the returned data comprises nine-byte fixed-length data which has a first byte allocated to dummy data "dm"; a second byte loaded with data "F3" having the upper four bits "F" indicative of an identifier (ID) of the game machine manipulation device CT10 and the lower four bits "3" indicative of one half of a data length (6 bytes) of data rx0–rx5 after a fourth byte; a third byte allocated to data "in" indicating whether the game machine manipulation device CT10 is not initialized; the fourth byte allocated to a revision code "rv" corresponding to the game machine manipulation device CT10; a fifth byte allocated to available mode quantity data "mn" indicative of the number of modes which can be set by software from the game machine main body 27 (in this embodiment, two modes of an analog control mode and a digital control mode); a sixth byte allocated to data "cm" indicative of a currently valid mode in the game machine manipulation device CT10; a seventh byte allocated to actuator quantity data "an" indicative of the number of actuators (for example, response means 21 and 51) equipped in the game machine manipulation device CT10; and an eighth byte allocated to "on" indicative of a total number of actuators which can be operated simultaneously (response means 21 and 51, or the like). Data in a ninth byte is indefinite.

Thus, the CPU of the game machine manipulation device CT10 returns the controller information shown in the lower column of FIG. 16 to the game machine main body 27 at step SP23 in FIG. 14, so that the CPU of the game machine main body 27 can acquire function information on the game machine manipulation device CT10 being connected to the game machine main body 27. It should be noted that this information only indicates the number of modes which can be set by software, and the contents of the information are returned from the game machine manipulation device CT10 to the game machine main body 27 correspondingly when the controller mode acquisition command is transmitted from the game machine main body 27 to the game machine manipulation device CT10.

Specifically, when the transmission of the controller information is terminated at the aforementioned step SP23, the CPU of the game machine manipulation device CT10 returns to step SP21 to wait for another command. At this time, if data transmitted from the game machine main body 27 to the game machine manipulation device CT10 is a controller (game machine manipulation device) mode acquisition command shown in the upper column of FIG. 17, the CPU of the game machine manipulation device CT10 proceeds to step SP24 in FIG. 14 to transmit to the game machine main body 27 the contents of information on modes of the game machine manipulation device CT10 which can be set by software.

In this event, the controller mode acquisition command transmitted from the game machine main body 27 to the game machine manipulation device CT10, as shown in the upper column of FIG. 17, comprises nine-byte fixed-length packet data which has a first byte allocated to data "01" indicating that this command is a command for the game machine manipulation device; a second byte allocated to data "4C" indicating that this command is a command for requesting controller modes which can be set by software; a third byte allocated to data "00" corresponding to the data "4C" in the second byte; a fourth byte allocated to list number data "ln" indicating a list number in the RAM of the game machine manipulation device CT10 which stores a list of a variety of controller modes (controller IDs) required by the CPU of the game machine main body 27; and a fifth byte to a ninth byte loaded with indefinite data.

Thus, the CPU of the game machine manipulation device CT10, upon receiving the controller mode acquisition command shown in the upper column of FIG. 17, proceeds from step SP21 to step SP24 in FIG. 14 to return a controller ID (controller mode identification) indicative of each controller mode in a list as specified by a list number specified by the fourth byte of the controller mode acquisition command (the upper column of FIG. 17). Based on that list number, the controller ID is selected out of lists stored in the ROM of the game machine manipulation device CT10, as transmission data to the game machine main body 27 as shown in the lower column of FIG. 17. Specifically, this returned data comprises nine-byte fixed-length data which has a first byte allocated to dummy data "dm"; a second byte loaded with data "F3" having the upper four bits "F" indicative of an identifier (ID) of the game machine manipulation device CT10 and the lower four bits "3" indicative of one half of a data length (6 bytes) of data rx0–rx5 after a fourth byte; a third byte allocated to data "in" indicating whether the game machine manipulation device CT10 is not initialized; and a sixth byte and a seventh byte allocated to controller ID data "n0" and "n1" indicative of setting available modes read from the list. In this connection, data in the fourth, fifth, eighth and ninth bytes are indefinite.

Thus, the CPU of the game machine manipulation device CT10 returns the controller mode information (controller ID) shown in the lower column of FIG. 17 to the game machine main body 27 at step SP24 in FIG. 14, so that the CPU of the game machine main body 27 can determine modes (analog control mode, digital control mode, and so on), which can be set to the game machine manipulation device CT10 being connected thereto, from the controller ID data.

When the processing at step SP24 in FIG. 14 is terminated as described above, the CPU of the game machine manipulation device CT10 returns to the foregoing step SP21 to wait for another command. In this event, the game machine main body 27 transmits a mode to be set, out of available modes acquired as the controller ID data from the game machine manipulation device CT10 by the foregoing processing at step SP24, to the game machine manipulation device CT10 as a controller mode setting command shown in the upper column of FIG. 18.

The controller mode setting command comprises nine-byte fixed-length packet data, as shown in the upper column of FIG. 18, which has a first byte allocated to data "01" indicating that this command is a command for the game machine manipulation device; a second byte allocated to data "44" indicating that this command is a command for setting a mode for the controller (game machine manipulation device); a third byte allocated to data "00" corresponding to the data "44" in the second byte; a fourth byte allocated to a controller mode (analog control mode, digital control mode, or the like) to be set by the CPU of the game machine main body for the game machine manipulation device CT10 with a list number data "cm" in the ROM of the game machine manipulation device CT10, which stores the controller ID indicative of the controller mode; and a fifth byte allocated to data "ik" (pause information or operation information) for setting the manipulation button 38 (FIG. 4) for switching modes disposed in the game machine manipulation device CT10 in an inoperative (pause) state (lock) or an operative state (unlock). In this connection, data in a sixth byte to a ninth byte are indefinite.

Thus, the CPU of the game machine manipulation device CT10, upon receiving the controller mode setting command shown in the upper column of FIG. 18, proceeds from step SP21 to step SP25 in FIG. 14 to read the controller ID in the ROM of the game machine manipulation device CT10 based on the list number data "cm" of the controller ID assigned to the fourth byte of the controller mode setting command (in the upper column of FIG. 18), and to set the mode specified by the controller ID (analog control mode, digital control mode or the like) to the CPU of the game machine manipulation device CT10. In this event, the CPU of the game machine manipulation device CT10 returns transmission data shown in the lower column of FIG. 18 to the game machine main body 27. This returned data comprises nine-byte fixed-length data which has a first byte allocated to dummy data "dm"; a second byte loaded with data "F3" having the upper four bits "F" indicative of an identifier (ID) of the game machine manipulation device CT10 and the lower four bits "3" indicative of one half of a data length (6 bytes) of data rx0–rx5 in a fourth and subsequent bytes; a third byte allocated to data "in" indicating whether or not the game machine manipulation device CT10 is not initialized; and a fourth byte through a ninth byte loaded with indefinite data. The CPU of the game machine main body 27 can recognize that the setting (switching) of the control mode has been completed by receiving the data "F3" in the second byte of the transmission data.

In this way, the CPU of the game machine manipulation device CT10 returns to step SP21 to wait for another command to be transmitted thereto from the game machine main body 27, when the setting (switching) of the controller mode is completed at step SP24 in FIG. 14.

At this time, the game machine main body 27 transmits an actuator (response means 21, 51 and so on) information acquisition command shown in the upper column of FIG. 19 to the game machine manipulation device CT10 for requesting the CPU of the game machine manipulation device CT10 to provide information on a single or a plurality of actuators (response means) disposed in the game machine manipulation device CT10 being connected to the game machine main body 27.

The actuator information acquisition command comprises nine-byte fixed-length packet data, as shown in the upper column of FIG. 19, which has a first byte allocated to data "01" indicating that this command is a command for the game machine manipulation device; a second byte allocated to data "46" indicating that this command is a command for requesting information on actuators in the controller (game machine manipulation device); a third byte allocated to data "00" corresponding to the data "46" in the second byte; and a fourth byte allocated to an actuator number data "an" indicative of a number of an actuator (response means) (for example, "1" or "2" when the number of response means is two). In this connection, data in a fifth byte to a ninth byte are indefinite.

Thus, the CPU of the game machine manipulation device CT10, upon receiving the actuator information acquisition command shown in the upper column of FIG. 19, proceeds from step SP21 to step SP26 in FIG. 14 to read data on the response means 21 or 51 having the actuator number allocated in the fourth byte of the actuator information acquisition command (in the upper column of FIG. 19) from the ROM of the game machine manipulation device CT10, and to return the data on the actuator (the type of the actuator, a data length of a parameter) to the game machine main body 27 as transmission data shown in the lower column of FIG. 19. This transmission data comprises nine-byte fixed-length data, which has a first byte allocated to dummy data "dm"; a second byte loaded with data "F3" having the upper four bits "F" indicative of an identifier (ID) of the game machine manipulation device CT10 and the lower four bits "3" indicative of one half of a data length (6 bytes) of data rx0–rx5 after a fourth byte; a third byte allocated to data "in" indicating whether the game machine manipulation device CT10 is not initialized; a sixth byte allocated to classification number data "fn" for a function of the actuator (response means); a seventh byte allocated to auxiliary number data "sb" for further classifying the actuator (response means) classified by the classification number data "fn" in the sixth byte; and an eighth byte allocated to data "ic" indicative of a consumed current required to drive the actuator (response means). In this connection, data in a fourth byte and a fifth byte are indefinite.

The classification number data "fn" allocated in the sixth byte may classify actuators (response means), for example, into an actuator for generating continuous rotary vibrations, an actuator for generating continuous reciprocal vibrations, an actuator for generating intermittent reciprocal vibrations, an actuator for generating rotary vibrations, an actuator for generating reciprocal vibrations, and so on, as classification items. In addition, items classified by the auxiliary number data "sb" allocated in the seventh byte may include low speed rotation, high speed rotation, vibrating direction (X-axis direction, Y-axis direction, Z-axis direction), and so on.

Consequently, when the CPU of the game machine manipulation device CT10 finishes transmitting to the game machine main body 27 the information on the actuator (response means) corresponding to the actuator number requested at this time from the game machine main body 27 at step SP26 in FIG. 14, the CPU returns to the foregoing step SP21 to wait for another command to be transmitted from the game machine main body 27. At this time, the CPU of the game machine main body 27 detects the number of actuators (response means) in the game machine manipulation device CT10 being connected thereto, in the controller information acquisition processing described above in connection with step SP23. Therefore, by repeatedly transmitting the actuator information acquisition command described above with reference to FIG. 19 to the game machine manipulation device CT10 a number of times equal to the number of actuators (response means), the CPU of the game machine manipulation device CT10 repeats the processing at step SP26 for the number of times equal to the number of actuators (response means), and consequently, data on all the actuators (response means) are transmitted to the game machine main body 27.

When the CPU of the game machine manipulation device CT10 finishes returning the information on all the actuators (response means 21 and 51) by repeating step SP26 in FIG. 14 as described above, the CPU returns to the foregoing step SP21 to wait for another command to be transmitted from the game machine main body 27.

In this event, the game machine main body 27 transmits an actuator (response means 21, 51 and so on) status acquisition command shown in the upper column of FIG. 20 to the game machine manipulation device CT10 for requesting the CPU of the game machine manipulation device CT10 to provide the value of parameter (i.e., data used for controlling the driving of an actuator) set for the actuator (response means) in the game machine manipulation device CT10 being connected to the game machine body 27.

This actuator status acquisition command comprises nine-byte fixed-length packet data, as shown in the upper column of FIG. 20, which has a first byte allocated to data "01" indicating that this command is a command for the game machine manipulation device; a second byte allocated to data "48" indicating that this command is a command for requesting the status of the actuators in the controller (game machine manipulation device); a third byte allocated to data "00" corresponding to the data "48" in the second byte; and a fourth byte allocated to actuator number data "an" indicating a number of an actuator (response means) (for example, "1" or "2" when the number of the response means is two). In this connection, data in a fifth byte to a ninth byte are indefinite.

Thus, the CPU of the game machine manipulation device CT10, upon receiving the actuator status acquisition command shown in the upper column of FIG. 20, proceeds from step SP21 to step SP27 in FIG. 14 to read a parameter set for a response means 21 or 51 having the actuator number allocated in the fourth byte of the actuator status acquisition command (in the upper column of FIG. 20) from the RAM of the game machine manipulation device CT10, in order to return the parameter (i.e., data used for controlling the driving of the actuator) set for the actuator at this time to the game machine main body 27 as transmission data shown in the lower column of FIG. 20. This transmission data comprises nine-byte fixed-length data which has a first byte allocated to dummy data "dm"; a second byte loaded with data "F3" having the upper four bits "F" indicative of an identifier (ID) of the game machine manipulation device CT10 and the lower four bits "3" indicative of one half of a data length (6 bytes) of data rx0–rx5 in a fourth and subsequent bytes; a third byte allocated to data "in" indicating whether the game machine manipulation device CT10 is not initialized; a sixth byte and a seventh byte allocated to reserved data (spare data) "v0," "v1"; an eighth byte allocated to data "sz" indicative of a data length (in bytes) set as a parameter for the actuator; and a ninth byte allocated to data "s0" indicative of the value of a first byte of the parameter for the actuator.

Thus, the game machine manipulation device CT10 returns transmission data shown in the lower column of FIG. 20 to the game machine main body 27 at step SP27 in FIG. 14, so that the CPU of the game machine main body 27 can recognize the parameter being set for the actuator.

More specifically, a parameter set for an actuator (response means) is defined such that the length of data usable for transmission (the ninth byte in the lower column of FIG. 20) is one byte. If the data length of a parameter being set for an actuator is longer than one byte of the ninth byte, the CPU of the game machine manipulation device CT10 proceeds from step SP21 to step SP28, after the completion of the processing at step SP27 in FIG. 14, to transmit to the game machine main body 27 data that has overflowed from the data transmitted to the game machine main body 27 at the preceding step SP27. This communication continuation data includes data to be continuously transmitted which have been allocated in the fourth byte to ninth byte, as illustrated in the lower column of FIG. 21. In this connection, data shown in the upper column of FIG. 21 are those used by the game machine main body 27 for continuously communicating with the game machine manipulation device CT10.

When the status of one actuator (response means) has been transmitted to the game machine main body 27 at step S27 and step SP28 in FIG. 12 as described above, the game machine main body 27 again transmits a command for acquiring the status of another actuator (response means) to the game machine manipulation device CT10 subsequent to the completed transmission, in a manner similar to the case described above for the command shown in the upper column of FIG. 18. In this event, an actuator (response means) for which the status is to be acquired is specified by the actuator number data "an" in the fourth byte shown in the upper column of FIG. 18.

Consequently, when the game machine main body 27 finishes acquiring the status of all the actuators (response means 21 and 51) in the game machine manipulation device CT10, the game machine main body 27 subsequently transmits a command for acquiring a list of simultaneously operable actuators, shown in the upper column of FIG. 22, to the game machine manipulation device CT10 to request a list of simultaneously operable actuators (for example, the response means 21 and 51) in all the actuators disposed in the game machine manipulation device CT10.

This command for acquiring a list of simultaneously operable actuators comprises nine-byte fixed-length packet data, as shown in the upper column of FIG. 22, which has a first byte allocated to data "01" indicating that this command is a command for the game machine manipulation device; a second byte allocated to data "47" indicating that this command is a command for requesting a list of simultaneously operable actuators in the controller (game machine manipulation device); a third byte allocated to data "00" corresponding to the data "47" in the second byte; and a fourth byte allocated to a list number data "ls" indicative of a list of combinations of simultaneously operable actuators required at this time by the game machine main body 27. In this connection, data in a fifth byte to a ninth byte are indefinite.

When the command for acquiring the simultaneously operable actuator list is transmitted from the game machine main body 27 to the game machine manipulation device CT10 as described above, the CPU of the game machine manipulation device CT10 proceeds from step SP21 to step SP29 in FIG. 14 to return a simultaneously operable actuator list, as shown in the lower column of FIG. 22, to the game machine main body 27. This actuator list (in the lower column of FIG. 22) comprises nine-byte fixed-length data which has a first byte allocated to dummy data "dm"; a second byte loaded with data "F3" having the upper four bits "F" indicative of an identifier (ID) of the game machine manipulation device CT10 and the lower four bits "3" indicative of one half of a data length (6 bytes) of data rx0–rx5 in a fourth and subsequent bytes; a third byte allocated to data "in" indicating whether the game machine manipulation device CT10 is not initialized; a sixth byte allocated to a data length "sz" of the actuator list in accordance with the number of actuators when one actuator number is represented in one byte; and a seventh byte to a ninth byte allocated to actuator numbers of simultaneously operable actuators, one number in one byte. In this connection, if the number of simultaneously operable actuators is four or more, the data length of the list is given by the data "sz" indicative of the data length in the sixth byte of the transmission data. Thus, in accordance with the data "sz", a portion of the list which has overflowed in the first transmission of the actuator list is transmitted through the communication continuation data described above with reference to FIG. 21. In this way, the CPU of the game machine main body 27 can recognize simultaneously operable actuators in the game machine manipulation device CT10.

When the simultaneously operable actuator list finishes being returned at step SP29 in FIG. 14, the CPU of the game machine manipulation device CT10 returns to step SP21 to wait for the reception of another command.

Then, the CPU of the game machine main body 27 subsequently transmits a command for setting details of parameters for actuators to the game machine manipulation device CT10. This command for setting details of parameters for actuators is provided to set parameters for actuators in the game machine manipulation device CT10 with a button acquisition command transmitted from the game machine main body 27 to the game machine manipulation device CT10 during the progress of a game, when the game machine main body 27 is to acquire information on manipulations on the manipulation buttons (14A–14D, 16a–16D, 19a–19d, and so on) in the game machine manipulation device CT10 during the progress of the game by transmitting the button acquisition command from the game machine main body 27 to the game machine manipulation device CT10. This command comprises nine-byte fixed-length packet data, as shown in the upper column of FIG. 23, which has a first byte allocated to data "01" indicating that this command is a command for the game machine manipulation device; a second byte allocated to data "4D" indicating that this command is the command for setting details of parameters for actuators; a third byte allocated to data "00" corresponding to the data "4D" in the second byte; and a fourth byte through a ninth byte allocated to number data "s0," "s1," "s2," "s3," "s4," "s5" of actuators for which parameters are to be set when a button acquisition command is transmitted from the game machine main body 27 to the game machine manipulation device CT10 during the progress of a game.

Thus, when the CPU of the game machine manipulation device CT10 receives the command for setting the details of the parameters for the actuators, the CPU proceeds from step SP21 to step SP30 in FIG. 14 to set actuators specified in the command for setting the details of the parameters for the actuators to the RAM of the game machine manipulation device CT10. Thus, when a button acquisition command is received from the game machine main body 27 during the progress of a game, associated parameters are set to the set actuators in synchronism therewith.

More specifically, when the details of the parameters are set for the associated parameters at step SP30 in FIG. 14, the game machine manipulation device CT10 returns transmission data shown in the lower column of FIG. 23 to the game machine main body 27. This transmission data comprises nine-byte fixed-length data which has a first byte allocated to dummy data "dm"; a second byte loaded with data "F3" having the upper four bits "F" indicative of an identifier (ID) of the game machine manipulation device CT10 and the lower four bits "3" indicative of one half of a data length (6 bytes) of data rx0–rx5 in a fourth and subsequent bytes; a third byte allocated to data "in" indicating whether the game machine manipulation device CT10 is not initialized; and a fourth byte through a ninth byte allocated to actuator parameter details setting data which have been set before the execution of the command.

After completing the processing at step SP30 in FIG. 14, the CPU of the game machine manipulation device CT10 returns to step SP21 in FIG. 14 to wait for another command transmitted from the game machine main body 27.

Here, the game machine main body 27, which has completely set details of parameters for the actuators in the game machine manipulation device CT10, subsequently transmits a command for instructing the game machine manipulation device CT10 to set OFF the parameters to the game machine manipulation device CT10. This command allocates data "0" to the fourth byte in the transmission data previously shown in the upper column of FIG. 15 for instructing the game machine manipulation device CT10 to set OFF the controller parameters. This causes the CPU of the game machine manipulation device CT10, which has received the command, to proceed from step SP21 to step SP22 in FIG. 14 to set OFF (or terminate) a parameter setting mode. Then, the CPU of the game machine manipulation device CT10 returns to the foregoing step SP11 to enter a controller communication mode.

In the controller communication mode, the CPU of the game machine manipulation device CT10 gets in a state of waiting for a command from the game machine main body 27 at subsequent step SP12. Here, the game machine main body 27 transmits a controller button acquisition command to the game machine manipulation device CT10 for requesting the game machine manipulation device CT10 to provide information indicative of manipulation states of respective buttons (14a–14d, 16a–16d, 19a–19d, and so on) on the game machine manipulation device CT10.

This controller button acquisition command includes data tx0–tx5 which are variable-length data ranging from two to six bytes stored in a fourth byte through a ninth byte thereof, as shown in the upper column of FIG. 24. The controller button acquisition command also has a first byte allocated to data "01" indicating that this command is a command for the game machine manipulation device; a second byte allocated to "42" indicating that this command is the controller button acquisition command; a third byte allocated to indefinite data corresponding to the data "42" in the second byte; and a fourth byte through a ninth byte allocated to data set to the parameters for the actuators (response means 21 and/or 51) which have been set at step SP30 in FIG. 14.

Thus, the CPU of the game machine manipulation device CT10, upon receiving the controller button acquisition command shown in the upper column of FIG. 24, proceeds from step SP12 to step SP14 in FIG. 14, to set the parameters for the actuators (response means 21 and/or 51) with the parameter setting data in the fourth byte through the ninth byte (having variable lengths between two and six bytes) within the data received at this time, thereby vibrating these actuators (response means 21 and/or 51) based on the specified data. Also, the CPU of the game machine manipulation device CT10 transmits its button manipulation information to the game machine main body 27 through transmission data shown in the middle column or the lower column of FIG. 24.

The transmission data shown in the middle column of FIG. 24 is data transmitted from the game machine manipulation device CT10, which is in the state where the controller parameter setting mode is OFF, to the game machine main body 27. The transmission data shown in the lower column of FIG. 24, on the other hand, is data transmitted from the game manipulation device CT10, which is in the state where the controller parameter setting mode is ON, to the game machine main body 27. This transmission data has a fourth byte allocated to an upper byte "b0" of manipulation button depress data; a fifth byte allocated to a lower byte "b1" of the manipulation button depress data; and a sixth byte to a ninth byte allocated to, for example, analog level data "a0," "a1," "a2," "a3" in accordance with manipulations on the joysticks 36, 37 previously described with reference to FIGS. 4 and 13.

Subsequently, when the game machine main body 27 receives the transmission data shown in FIG. 24, the CPU of the game machine main body 27 can detect how the manipulation buttons or the analog joy sticks are being manipulated on the game machine manipulation device CT10, so that the game can be advanced in accordance with the detected manipulations.

When the CPU of the game machine main body 27 is going to vibrate a required actuator(s) (response means 21 and/or 51) in accordance with the progress of a game, the CPU of the game machine main body 27 transmits a command dedicated to set a parameter(s) for the actuator(s), shown in the upper column of FIG. 25, to the game machine manipulation device CT10. This command has a second byte allocated to data "49" indicating that this command is the command for setting a parameter for an actuator; a fourth byte allocated to actuator number data "an" of an actuator to be set; a fifth byte allocated to a data size "sz" which is set to a parameter for the actuator; and a sixth byte to a ninth byte allocated to actually set data.

Thus, when the game machine manipulation device CT10 receives the transmission data, the CPU of the game machine manipulation device CT10 proceeds from step SP12 to step SP15 in FIG. 14 to set the parameter for the actuator (response means 21 and/or 51) specified by the command, thereby vibrating the actuator. In this connection, at this time, transmission data shown in the lower column of FIG. 25 is returned from the game machine manipulation device CT10.

Figures 26, 27:
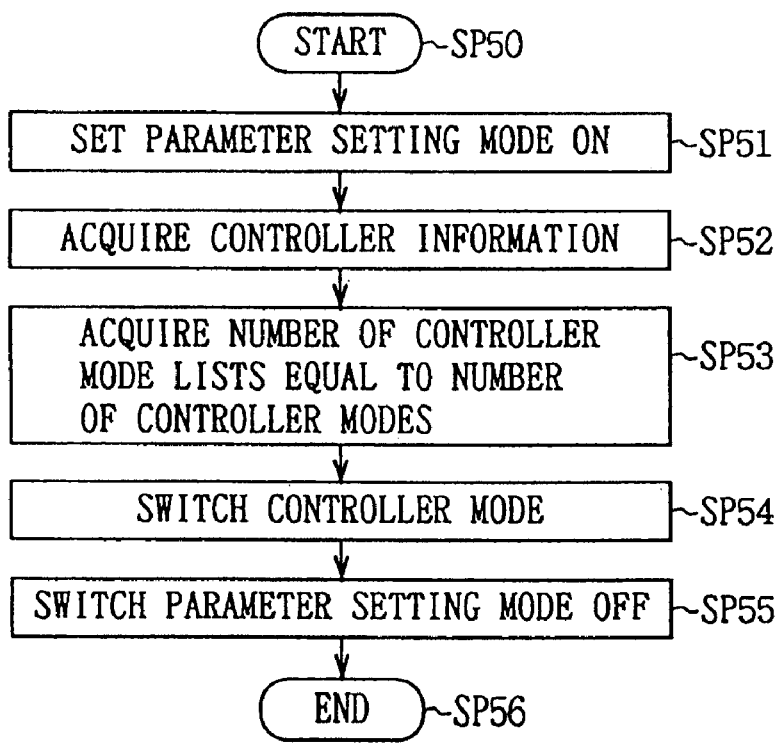
FIG. 26 is a table showing an actuator mode setting command.
FIG. 27 is a flow chart illustrating a controller mode setting processing procedure.

Also, the game machine main body 27 transmits an actuator mode setting command, as shown in the upper column of FIG. 26, to the game machine manipulation device CT10. This command is provided to set ON or OFF an actuator parameter synchronous update mode, and has a second byte allocated to data "4A" indicating that this command is the actuator mode setting command. If synchronous update mode setting data "sg" in a fourth byte is set ON (i.e., set to "1"), the CPU of the game machine manipulation device CT10 proceeds from step SP12 to step SP16 in FIG. 14 to set ON the synchronous update command, whereby the parameter specified by the actuator parameter setting command ("49") shown in FIG. 25 is not immediately reflected as an operation of the actuator but is buffered in the RAM of the game machine manipulation device CT10 for a time period until the actuator mode setting command ("4A") is next inputted. Then, at the time the actuator mode setting command ("4A") is next transmitted to the game machine manipulation device CT10, the parameters for associated actuators so far buffered in the RAM are outputted all at once to the corresponding actuators (response means 21 and/or 51) to vibrate them.

On the other had, when the synchronous update mode setting data "sg" allocated in a fourth byte of the transmission data shown in the upper column of FIG. 26 is set OFF (i.e., set to "0"), the contents of parameters set for actuators, generated during the synchronous update mode being ON, are all cleared. Whenever the actuator parameter setting command ("49") described above with reference to the upper column of FIG. 25 is received by the game machine manipulation device CT10, an associated actuator is vibrated in response.

Thus, the game machine manipulation device CT10 switches between the controller communication mode and the parameter setting mode in accordance with the processing procedure illustrated in FIG. 14. In a normal communication mode for a communication with the game machine main body 27, when the game machine manipulation device CT10 receives data of setting a parameter for an actuator (i.e., dynamic transmission data) in accordance with the progress of a game with the controller information acquisition command (controller button information acquisition command) or the actuator parameter setting command from the game machine main body 27, the game machine manipulation device CT10 vibrates the specified actuator (response means 21 and/or 51) in response to the received data. Also, in the communication mode, data on manipulations on the manipulation buttons 14a–14d, 16a–16d, 19a–19d or the analog joysticks 36, 37 in the game machine manipulation device CT10 are transmitted from the game machine manipulation device CT10 to the game machine main body 27 in accordance with a mode set at this time (digital control mode or analog control mode), so that a game is advanced in response to manipulations of the user in the game machine main body 27 and the game machine manipulation device CT10.

In the parameter setting mode, in turn, the game machine main body 27 inquires the game machine manipulation device CT10 about information on the game machine manipulation device CT10 (available modes, information on actuators, and so on), acquires such information from the ROM and RAM of the game machine manipulation device, and can set a variety of modes such as a mode for the game machine manipulation device CT10, an actuator parameter setting mode, and so on based on the acquired information.

FIG. 27 illustrates a controller mode setting procedure executed by the game machine main body 27. The CPU of the game machine main body 27 enters the processing procedure at step SP50, and transmits a command (FIG. 15) for setting ON the parameter setting mode to the game machine manipulation device CT10 at step SP51 to switch the game machine manipulation device CT10 to the parameter setting mode described above with reference to FIG. 14.

Then, the CPU of the game machine main body 27 proceeds to subsequent step SP52 to acquire information on the controller (a total number of modes available to the game machine manipulation device CT10, a total number of actuators, and so on). Next, the CPU of the game machine main body 27 acquires a number of controller mode lists equal to the number of modes possessed by the game machine manipulation device CT10 at subsequent step SP53. In this way, the CPU of the game machine main body 27 can acquire information (information on the modes, the actuators and so on) on the game machine manipulation device CT10 being connected thereto, sets a mode suitable to the contents of a game played at this time in accordance with the acquired information at step SP54, and proceeds to step SP55 to switch OFF the parameter setting mode of the game machine manipulation device 10.

Figure 28:
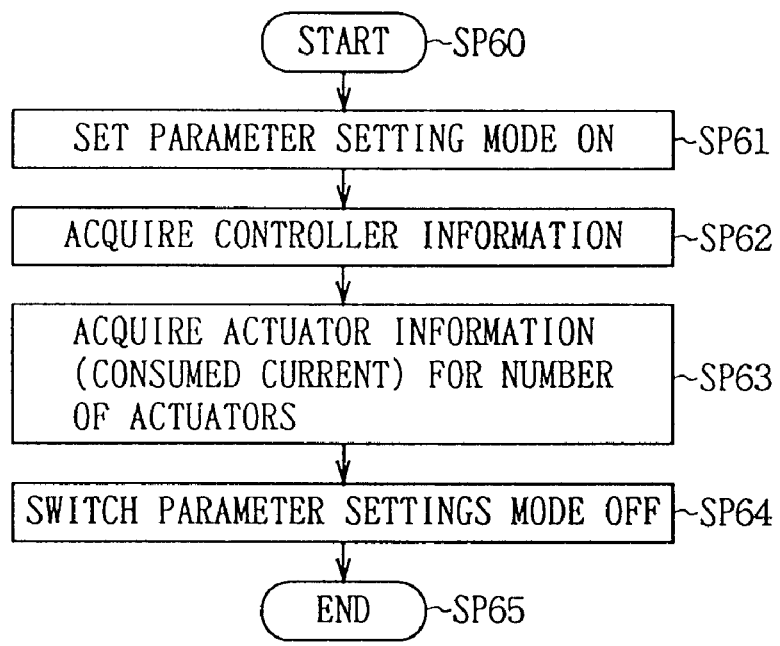
FIG. 28 is a flow chart illustrating an actuator information acquisition processing procedure.

FIG. 28 illustrates a controller actuator information acquisition procedure executed by the game machine main body 27. The CPU of the game machine main body 27 enters the processing procedure at step SP60, and transmits a command (FIG. 15) for setting ON the parameter setting mode to the game machine manipulation device CT10 at step SP61 to switch the game machine manipulation device CT10 to the parameter setting mode described above with reference to FIG. 14.

Then, the CPU of the game machine main body 27 proceeds to subsequent step SP62 to acquire information on the controller (a total number of modes available to the game machine manipulation device CT10, a total number of actuators, and so on). Next, the CPU of the game machine main body 27 acquires a number of actuator information (including consumed current data) equal to the number of actuators possessed by the game machine manipulation device CT10 with the actuator information acquisition command described above with reference to FIG. 19 at subsequent step SP63. In this way, the CPU of the game machine main body 27 can acquire the information on the actuators (response means 21, 51) disposed in the game machine manipulation device CT10 being connected thereto, and then proceeds to step SP64 to switch OFF the parameter setting mode of the game machine manipulation device CT10.

Figure 29:
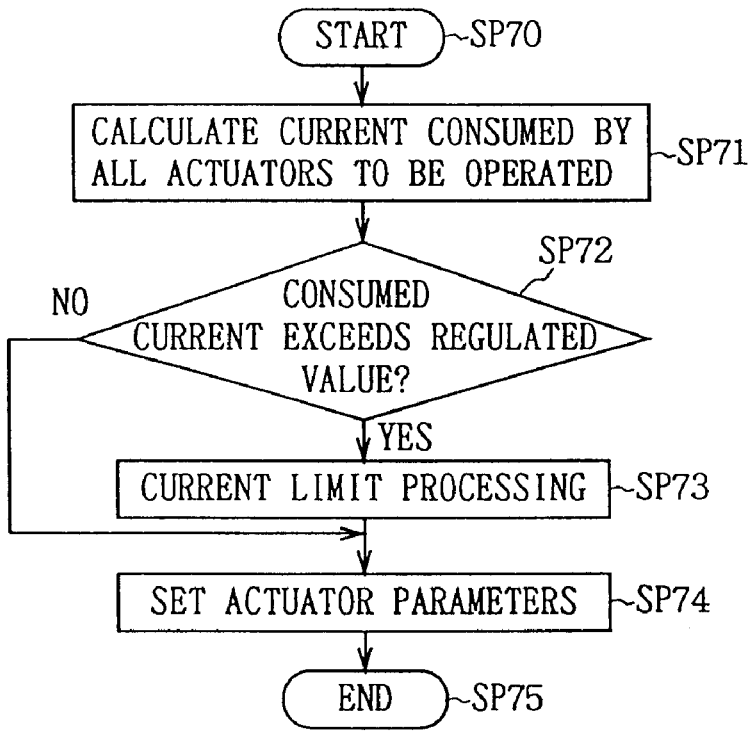
FIG. 29 is a flow chart illustrating a current control processing procedure.

FIG. 29 illustrates an actuator (response means 21, 51) current limit processing procedure executed by the CPU of the game machine main body 27. The CPU of the game machine main body 27 determines whether or not the value of a current to be applied to each actuator is limited by the current limit processing, when it sets a parameter for each actuator in the game machine manipulation device CT10 (i.e., when it drives each actuator). More specifically, the CPU of the game machine main body 27, which has acquired a consumed current required to each actuator (response means 21 and/or 51) in the game machine manipulation device CT10 by the actuator information acquisition processing described above with reference to FIG. 28, calculates at step SP71 the value of total currents possibly consumed by all the actuators (response means 21, 51) to be driven in accordance with the contents of a game under progress, based on the consumed current data previously acquired thereby. Then, at subsequent step SP72, the CPU determines whether or not the value of total consumed current exceeds a predetermined value. If an affirmative result is obtained, this means that if all the actuators to be driven are actually driven with determined current values, most current is likely to be consumed by an actuator which essentially consumes more current, with the result that an actuator which consumes less current would hardly be vibrated.

Therefore, the CPU of the game machine main body 27 proceeds to step SP73 to execute processing for clipping a maximum value of a current to be applied to an actuator which consumes more current, in order to limit a total current consumed by all the actuators to the predetermined value or less. In this embodiment, the game machine manipulation device CT10 has the response means 21 for generating vibrations by rotating the motor 24 serving as an actuator, and the response means 51 of voice coil type having a vibrator for generating reciprocal vibrations. In this case, a restriction is only conducted to clip a maximum value of a current applied to the response means 51 of voice coil type because the value of current applied to the response means 51 can be limited by the game machine main body 27. As this current limit processing, the response means 51 may be applied with a current having a waveform (current value data) with a clipped maximum value, such as those described above with reference to FIGS. 10 and 11.

Thus, the CPU of the game machine main body 27 applies the current values determined at step SP73 for the respective actuators in a parameter setting operation at following step SP74, thereby achieving such a current limitation as to generate without fail intended vibrations from the actuator (response means 21), which essentially consumes less current and generates relatively weak vibrations, while only slightly reducing the strength and the amplitude of vibrations generated by the actuator (response means 51) which consumes more current and generates relatively strong vibrations.

Conversely, if a negative result is obtained at step SP72, this means that the current need not be limited, so that the CPU of the game machine main body 27 applies the respective actuators with the determined currents.

For limiting the current, a variety of methods may be used, such as a method of reducing the amplitude of an entire current waveform, instead of the method of applying a waveform having a clipped maximum current value. Also, when the game machine manipulation device CT10 is provided with a plurality of current controllable response means (for example, response means of voice coil type), a variety of limiting methods may be used, such as liming currents to all response means, instead of the method of limiting a current to the response means which consumes the most current.

Figure 30:
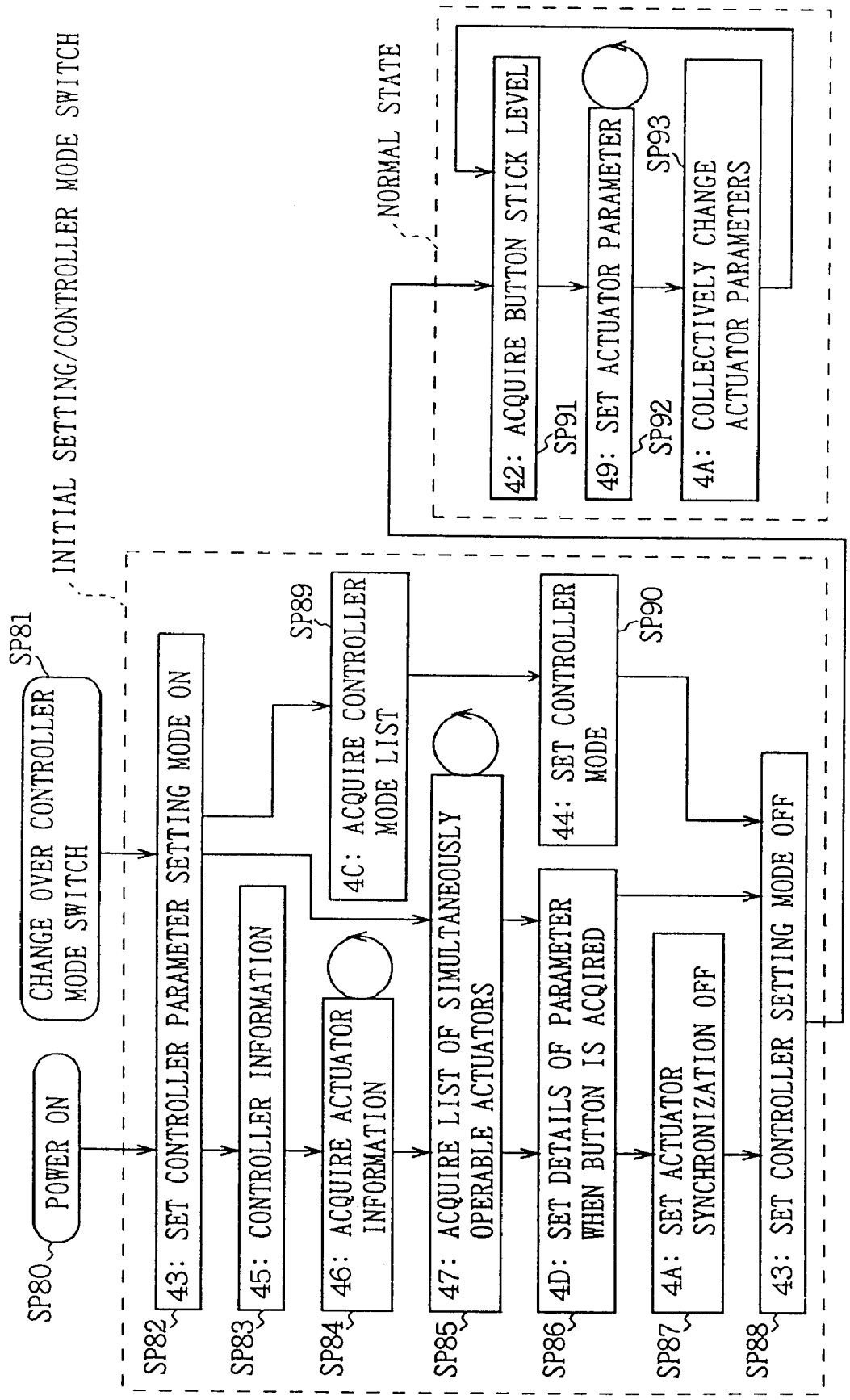
FIG. 30 is a flow chart illustrating an example of a communication in the protocol 2.0 mode.

FIG. 30 illustrates a communication processing state between the game machine main body 27 and the game machine manipulation device CT10 in a protocol 2.0 mode which permits the game machine main body 27 to transmit a command for inquiring the game machine manipulation device CT10 for its functions and a command for setting a variety of modes in the game machine manipulation device CT10. After the game machine main body 27 is powered on, the game machine manipulation device CT10 enters an initial setting mode from step SP82 to step SP88, wherein information on modes and actuators in the game machine manipulation device CT10 is transmitted to the game machine main body 27 in the parameter setting mode described above with reference to FIG. 14, and a mode and parameters for the actuators are set in accordance with a setting command from the game machine main body 27 based on such information.

After finishing the initial settings as above, the game machine manipulation device CT10 enters a normal mode from step SP91 to step SP93, wherein the game machine manipulation device CT10 performs communication processing with the game machine main body 27 to set parameters for the actuators in accordance with the contents of a game under progress, transmit information on manipulations of manipulation buttons or analog joysticks, made by the user, to the game machine main body 27, and perform other associated operations. In this normal state, when a request for acquiring information on buttons and joysticks is transmitted from the game machine main body 27 to the game machine manipulation device CT10, data for setting parameters for actuators is transmitted together with the command to set parameters for predetermined actuators, so that the actuators can be vibrated.

In this normal mode, if a parameter is to be set for an arbitrary actuator, for example, by software associated with a game, a parameter setting command is transmitted from the game machine main body 27 to the game machine manipulation device CT10, so that the game machine manipulation device CT10 can set the parameter for the arbitrary actuator specified at this time.

Also, in the normal mode, if an operation mode (analog control mode or digital control mode) is specified for the game machine manipulation device CT10, for example, by software associated with a game, a parameter setting command is transmitted from the game machine main body 27 to the game machine manipulation device CT10 to cause the game machine manipulation device CT10 to be in a controller mode switch mode. Then, the game machine manipulation device CT10 proceeds from step SP82 to step SP89 to transmit a controller mode list to the game machine main body 27, and switches the mode in accordance with a controller mode setting command transmitted back from the game machine main body 27 in response thereto. When manipulating the mode change-over switch 38 (FIG. 4) disposed on the game machine manipulation device CT10, the game machine main body 27 detects this and likewise enters the controller mode switch mode to switch the mode of the game machine manipulation device CT10.

Figure 31:
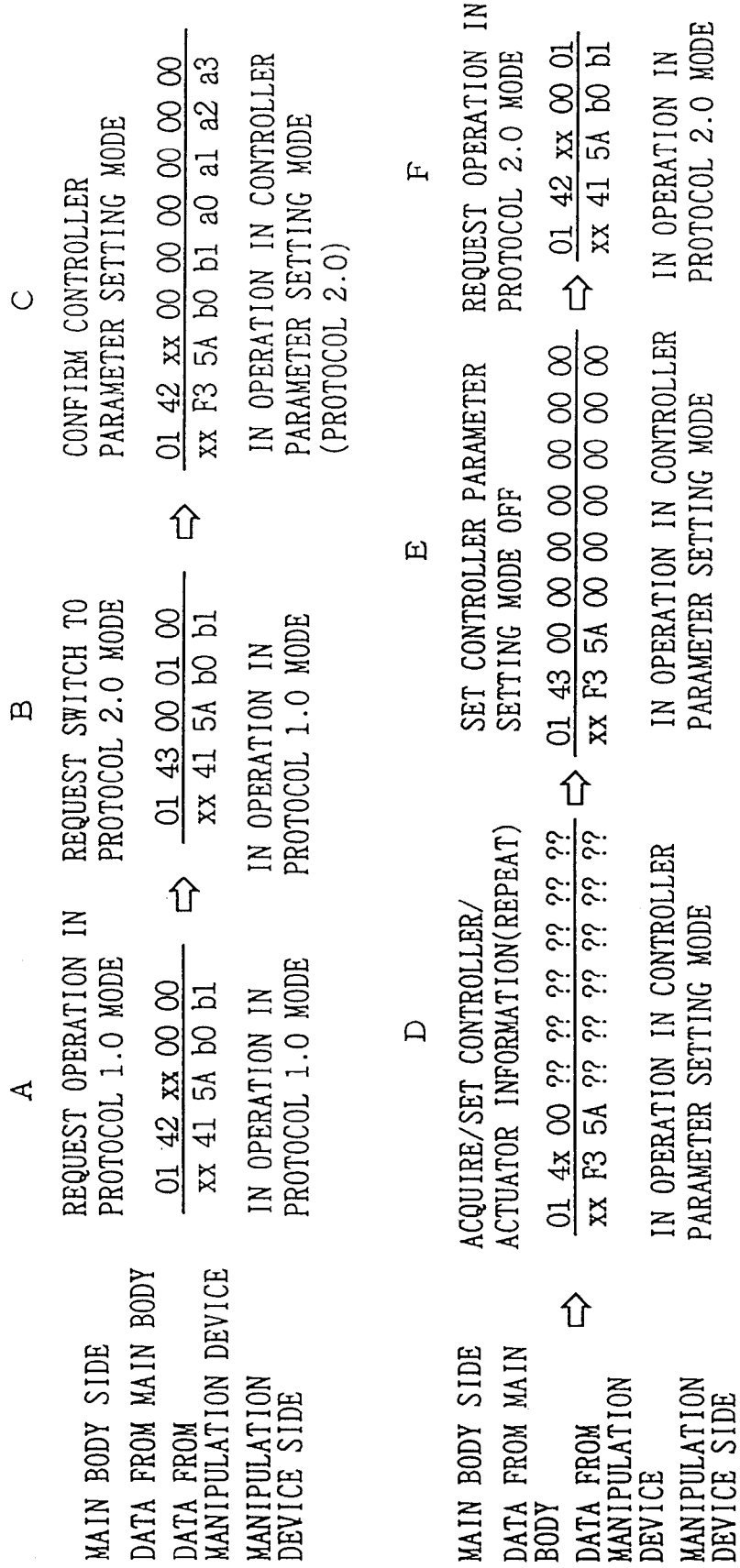

FIG. 31 illustrates exemplary communications that are made to switch from a protocol 1.0 to the protocol 2.0 mode, to acquisition of controller information and so on, to acquisition of button information, and to setting of actuators. Here, the protocol 1.0 mode is a protocol mode in which the game machine main body 27 does not perform inquiry or the like to the game machine manipulation device CT10 for its functions, in which case the controller button information acquisition command (FIG. 24) is only set as a command transmitted from the game machine main body 27 to the game machine manipulation device CT10. In this embodiment, protocol modes set for the game machine main body 27 and the game machine manipulation device CT10 support both the protocol 1.0 mode and the protocol 2.0 mode, and the controller button acquisition command (FIG. 24) and the parameter setting command (FIG. 15) are both set as commands to be transmitted from the game machine main body 27 to the game machine manipulation device CT10. Thus, when a request for switching to the protocol 2.0 mode as shown in FIG. 31B is transmitted to the game machine manipulation device CT10 which is operating in the protocol 1.0 mode in FIG. 31A, the game machine manipulation device CT10 enters a controller parameter setting mode as shown in FIG. 31C. Subsequently, as shown in FIG. 31D, a command for acquiring controller/actuator information is transmitted from the game machine main body 27 to the game machine manipulation device CT10 in a controller setting mode, and controller mode/actuator parameters are set for the game machine manipulation device CT10.

Then, when a command for terminating the controller parameter setting mode is transmitted from the game machine main body 27 to the game machine manipulation device CT10 as shown in FIG. 31E, the game machine manipulation device CT10 continuously operates in the protocol 2.0 mode as shown in FIG. 31F.

Figure 32:
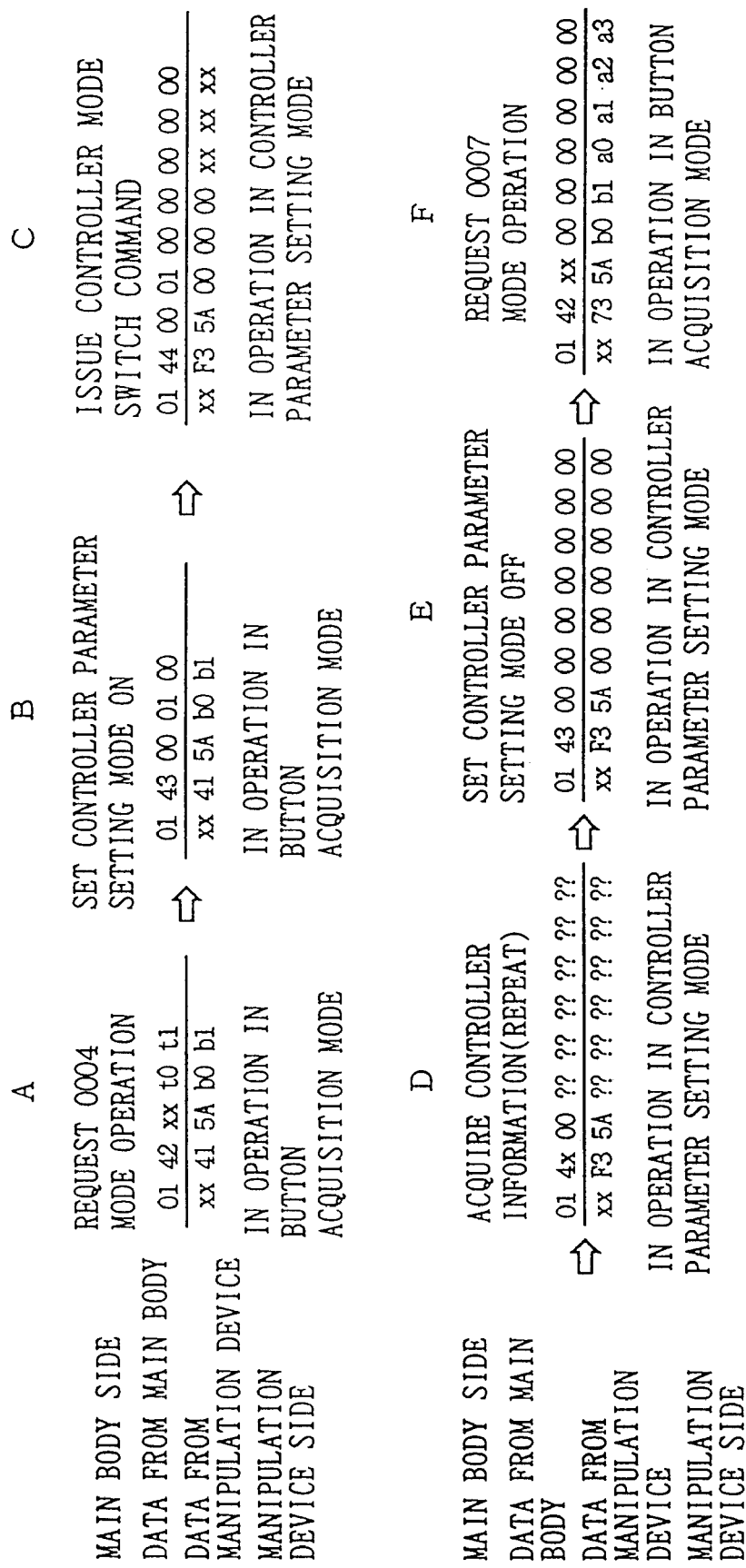
FIGS. 32A to 32F are state transition diagrams illustrating a mode switching procedure.

FIG. 32 shows exemplary communications when the controller mode is switched. When the game machine manipulation device CT10 is operating in a "0004" mode, which is one of controller modes, in FIG. 32A, a controller parameter setting command is transmitted from the game machine main body 27 as shown in FIG. 32B, and a controller mode switch command is subsequently transmitted from the game machine main body 27 as shown in FIG. 32C, causing the game machine manipulation device CT10 to operate in the controller parameter setting mode. Then, as a controller information acquisition command is transmitted from the game machine main body 27 in FIG. 32D, controller information is transmitted from the game machine manipulation device CT10 to the game machine main body 27. Finally, a command for setting OFF the controller parameter setting mode is transmitted from the game machine main body 27 to the game machine manipulation device CT10 as illustrated in FIG. 32E, the game machine manipulation device CT10 receives this command, and begins to operate in a "0007" mode, which is a new controller mode, as shown in FIG. 32F. As a result, the controller has been switched from the "0004" mode to the "0007" mode.

Figure 33:
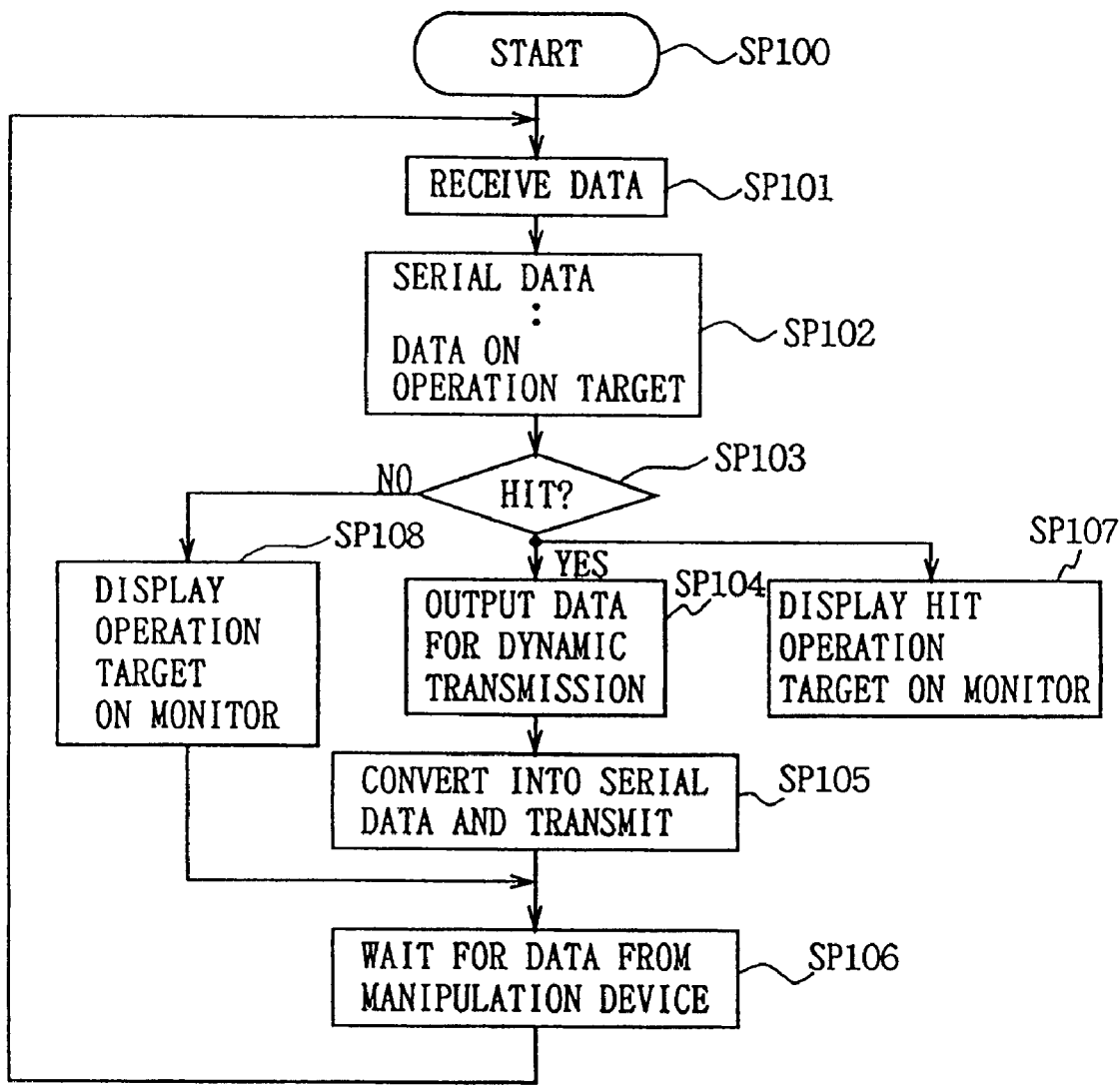
FIG. 33 is a flow chart illustrating a processing procedure executed by the game machine main body.

In the foregoing configuration, when the game machine main body 27 receives at step SP101 manipulation data of the game machine manipulation device CT10, which has been converted into serial data, as illustrated in FIG. 33, data on an operation target representative of the contents of a game is compared with the received serial data to determine whether the two data present a hit state at subsequent step SP102.

At step SP103, when the data on the operation target matches the serial data, i.e., when a hit occurs, the operation target, presenting the hit, is displayed on the monitor screen at step SP107, dynamic transmission data is outputted at step SP104, and the dynamic transmission data is converted into serial data which is then transmitted as a particular response signal to the game machine manipulation device CT10 at step SP105. This response signal includes data for specifying one or both of the actuators (response means 21 and/or 51) disposed in the game machine manipulation device CT10, as well as a voltage and a current to be applied to each of the specified response means and an application time. For the response means 51 out of the specified response means, the value of current applied thereto is limited as required in consideration of a total current consumed. This response signal is converted into serial data, and transmitted from the game machine main body 27 to the game machine manipulation device CT10 as data in the fourth byte to the ninth byte previously shown in the upper column of FIG. 24.

Afterwards, the CPU of the game machine 27 waits for data from the game machine manipulation device CT10 at step SP106.

Figure 34:
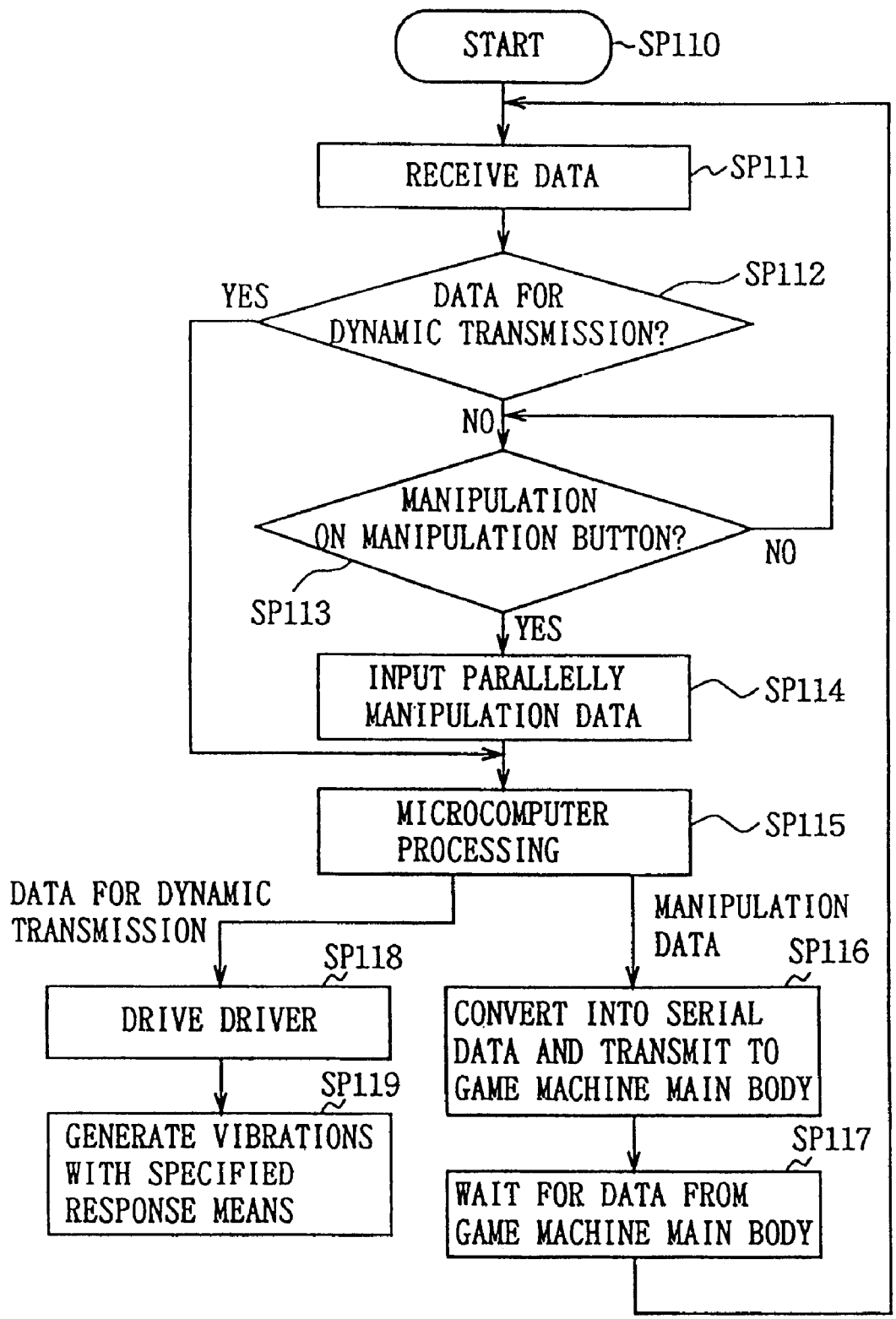
FIG. 34 is a flow chart illustrating a processing procedure executed by the game machine manipulation device.

The dynamic transmission data transmitted from the game machine main body 27 to the game machine manipulation device CT10 is received by the CPU of the game machine manipulation device CT10 at step SP111 in FIG. 34. If it is determined at step SP112 that this data is the dynamic transmission data, the CPU of the game machine manipulation device CT10 proceeds to step SP115 to drive the driver 34 (FIG. 13). Then, the CPU of the game machine manipulation device CT10 supplies the then specified response means 21 and/or 51 with voltages and currents being supplied from the game machine main body 27 for a predetermined time at step SP119.

Conversely, if it is determined at step SP112 that received data is not dynamic transmission data, the CPU of the game machine manipulation device CT10 proceeds to step SP113 to wait for an input or manipulation of a manipulation button or an analog joystick. If an affirmative result is obtained, the CPU of the game machine manipulation device CT10 proceeds to step SP114 to input manipulation data. Then, at step SP115, the microcomputer processing is performed (processing by the CPU). Specifically, in this microcomputer processing, manipulation data is returned from the game machine manipulation device CT10 in response to a controller button information acquisition command (FIG. 24) transmitted from the game machine main body 27 to the game machine manipulation device CT10. The CPU of the game machine manipulation device CT10 converts the manipulation data into serial data which is transmitted to the game machine main body 27 at step SP116, and then proceeds to the subsequent step SP117 to wait for data from the game machine body 27.

Also, when a parameter setting mode ON command (FIG. 15) is transmitted from the game machine main body 27, the CPU of the game machine manipulation device CT10 receives this command, and then transmits to the game machine main body 27 information on the game machine manipulation device CT10 itself (information on available modes in the game machine manipulation device CT10, the actuators possessed by the game machine manipulation device CT10, and so on) in the microcomputer processing at step SP115. Further, the CPU of the game machine manipulation device CT10 can set a variety of modes (digital control mode, analog control mode) and parameters for the actuators in accordance with a mode setting request and a parameter setting request from the game machine main body 27.

Thus, according to the foregoing configuration, by transmitting a parameter setting command (FIG. 15) from the game machine main body 27 to the game machine manipulation device CT10, it is possible to inquire functions of the game machine manipulation device CT10 connected to the game machine main body 27 and to set a mode in the game machine manipulation device CT10 and parameters for the actuators. Therefore, when any of various game machine manipulation devices is connected to the game machine main body 27, the game machine main body 27 can reliably determine functions of a game machine manipulation device being connected thereto, so that the game machine main body 27 can transmit commands suitable for the connected game machine manipulation device to correctly operate the respective actuators in the game machine manipulation device.

While the foregoing embodiment has been described for the game machine manipulation device CT10 which is equipped with the response means 21 for generating vibrations using a motor 24 and a response means 51 of voice coil type employed as actuators, the present invention is not limited to such particular means. Alternatively, any number of response means and a variety of combinations thereof can be applied for actuators. For example, a plurality of response means of voice coil type may be provided, a response means of motor type for generating low speed vibrations may be combined with a response means of motor type for generating high speed vibrations, and so on.

Also, in place of response means for generating vibrations, those for generating light and those for generating sound may be used.

Further, while the foregoing embodiment has been described for the single game machine manipulation device CT10 connected to the game machine main body 27, the present invention is not limited to the one-to-one connection. For example, a connection technique referred to as "multi-tap" may be used to connect a plurality of game machine manipulation devices (for example, four) to the game machine main body 27, such that the game machine main body 27 may inquire functions for each of the connected manipulation devices and set a mode and parameters for each of the connected manipulation devices.

In this case, by using the communication continuation command described above with reference to FIG. 21, it is possible to transmit data which overflow in one communication session.

In this way, when a plurality of game machine manipulation devices are connected, a consumed current will be increased for driving actuators (response means) in all the game machine manipulation devices. In this case, however, the consumed current can be effectively limited without deteriorating vibrations of required actuators by limiting a current value to certain actuator(s) by the current limit processing described above with reference to FIG. 29.

Also, in the foregoing embodiment, a current consumed by the response means in the game machine manipulation device is fetched into the game machine main body 27 as consumed power information, such that the value of a current applied to a response means is limited in accordance with the information. The present invention is not limited to this particular manner of controlling a current value. Alternatively, a variety of forms such as a combination of a current and a voltage, voltage values, and so on may be applied as control parameters for electric power information and the response means.

Industrial Applicability

In a game apparatus, game machine manipulation device, game system, and interactive communication method, the invention can be utilized for the case of connecting a variety of game machine manipulation devices having a variety of functions to a game machine main body.

What is claimed is:

1. A game apparatus having a reproducing function for a recording medium and having bidirectional communication means for receiving data of manipulations performed by a plurality of manipulation members from a game machine manipulation device and for transmitting predetermined control data to said game machine manipulation device, wherein:

function information regarding a function of said game machine manipulation device is fetched, the function information being stored in a nonvolatile storing means possessed by said game machine manipulation device and the function information being able to be set from said game apparatus, and said function of said game machine manipulation device is set based on said function information.

2. The game apparatus according to claim 1 wherein:

said function information includes identification information of said game machine manipulation device.

3. A game apparatus according to claim 1, wherein:

said function information includes information representing one of an analogue mode and a digital mode, which are communication control modes for said game machine manipulation device, and said game machine manipulation device is set to one of said analogue mode and said digital mode.

4. A game apparatus according to claim 1, wherein:

said function information includes one of operation information and pause information for a communication control mode switching manipulation member of said game machine manipulation device; and said function information is selectively set on said game machine manipulation device so as to set said communication control mode switching manipulation member of said game machine manipulation device in an operative state or in a pause state.

5. A game apparatus according to claim 1 wherein:

a function represented by said function information is transmitted as an exclusive command for setting a function of said game machine manipulation device at an arbitrary timing.

6. A game machine manipulation device being connected to a game apparatus and having bidirectional communication means for transmitting data of manipulations performed by a plurality of manipulation members to said game apparatus and for receiving predetermined control data from said game apparatus, wherein:

a nonvolatile storing means is provided to store function information regarding a function of said game machine manipulation device, the function being able to be set from the game apparatus, said function information stored in said nonvolatile storing means is transmitted to the game apparatus in accordance with an information request command from the game apparatus, and the function is set by the game apparatus which receives the function information.

7. A game system comprising a game machine manipulation device being connected to a game apparatus and having bidirectional communication means for transmitting data of manipulations performed by a plurality of manipulation members to said game apparatus and for receiving predetermined control data from said game apparatus, said game apparatus having a reproducing function for a recording medium and having bidirectional communication means for receiving data of manipulations performed by a plurality of manipulation members from said game machine manipulation device and for transmitting predetermined control data to said game machine manipulation device, wherein:

said game machine manipulation device is provided with a nonvolatile storing means where function information regarding functions of the game machine manipulation device which are able to be set by the game apparatus is stored, and transmits the function information to the game apparatus in accordance with an information request command from the game apparatus, and the game apparatus transmits the information request command to the game machine manipulation device, fetches the function information based on the information request command from the game machine manipulation device, and sets a function of the game machine manipulation device based on the function information.

8. A game system according to claim 7, wherein:

said function information includes information representing one of an analogue mode and a digital mode, which are communication control modes for said game machine manipulation device, and said game machine manipulation device is set to one of said analogue mode and said digital mode.

* * * * *